US009588773B2

(12) United States Patent
Nicol et al.

(10) Patent No.: US 9,588,773 B2
(45) Date of Patent: Mar. 7, 2017

(54) SOFTWARE BASED APPLICATION SPECIFIC INTEGRATED CIRCUIT

(71) Applicant: Wave Computing, Inc., Campbell, CA (US)

(72) Inventors: Christopher John Nicol, San Jose, CA (US); Samit Chaudhuri, Cupertino, CA (US); Radoslav Danilak, Cupertino, CA (US)

(73) Assignee: Wave Computing, Inc., Campbell, CA (US)

( * ) Notice: Subject to any disclaimer, the term of this patent is extended or adjusted under 35 U.S.C. 154(b) by 322 days.

(21) Appl. No.: 14/149,009

(22) Filed: Jan. 7, 2014

(65) Prior Publication Data

US 2014/0195779 A1 Jul. 10, 2014

Related U.S. Application Data

(60) Provisional application No. 61/749,419, filed on Jan. 7, 2013.

(51) Int. Cl.
*G06F 9/38* (2006.01)
*G06F 9/30* (2006.01)
*G06F 15/173* (2006.01)

(52) U.S. Cl.
CPC ........ *G06F 9/3891* (2013.01); *G06F 9/30014* (2013.01); *G06F 15/17362* (2013.01)

(58) Field of Classification Search
CPC ........................................................ G06F 9/38
See application file for complete search history.

(56) References Cited

U.S. PATENT DOCUMENTS

| | | | |
|---|---|---|---|
| 6,134,605 A | 10/2000 | Hudson et al. | |
| 6,363,470 B1 | 3/2002 | Laurenti et al. | |
| 7,420,390 B1* | 9/2008 | Hutton | H03K 19/17728 326/38 |
| 7,433,258 B2* | 10/2008 | Rao | G11C 11/4076 365/189.05 |
| 7,477,570 B2* | 1/2009 | Warner | G11C 7/12 365/189.14 |

(Continued)

FOREIGN PATENT DOCUMENTS

| | | |
|---|---|---|
| JP | 2005165961 A | 12/2003 |
| WO | WO2009131569 A1 | 10/2009 |

OTHER PUBLICATIONS

Altera, Stratix II Device Handbook, May 2007, Altera.*
International Search Report dated Feb. 6, 2015 for PCT/US2014/063591.

*Primary Examiner* — Eric Coleman
(74) *Attorney, Agent, or Firm* — Adams Intellex, PLC

(57) ABSTRACT

A processing device is provided. A cluster includes a plurality of groups of processing elements. A multi-word device is connected to the processing elements within the groups. Each processing element in a particular group is in communication with all other processing elements within the particular group, and only one of the processing elements within other groups in the cluster. Each processing element is limited to operations in which input bits can be processed and an output obtained without reference to other bits. The multi-word device is configured to cooperate with at least two other processing elements to perform processing that requires reference to other bits to obtain a result.

5 Claims, 29 Drawing Sheets

(56) References Cited

U.S. PATENT DOCUMENTS

| | | | |
|---|---|---|---|
| 8,078,839 B2 * | 12/2011 | Fant | G06F 9/322 |
| | | | 712/10 |
| 8,314,636 B2 | 11/2012 | Hutton et al. | |
| 8,341,469 B2 | 12/2012 | Miyama et al. | |
| 2007/0133399 A1 | 6/2007 | Gangwal | |
| 2009/0089605 A1 | 4/2009 | Westwick et al. | |
| 2010/0013517 A1 | 1/2010 | Manohar et al. | |
| 2010/0281448 A1 | 11/2010 | He | |
| 2011/0199117 A1 | 8/2011 | Hutchings et al. | |
| 2012/0106277 A1 * | 5/2012 | Kwean | G11C 11/40622 |
| | | | 365/194 |
| 2012/0119781 A1 | 5/2012 | Manohar et al. | |
| 2012/0235839 A1 | 9/2012 | Mazumdar et al. | |
| 2012/0319730 A1 | 12/2012 | Fitton et al. | |
| 2013/0009666 A1 | 1/2013 | Hutton et al. | |
| 2013/0009667 A1 | 1/2013 | Calhoun et al. | |
| 2013/0043902 A1 | 2/2013 | Rahim et al. | |
| 2014/0075144 A1 | 3/2014 | Sanders et al. | |

* cited by examiner

Reserved

Fig. 25

SOFTWARE BASED APPLICATION SPECIFIC INTEGRATED CIRCUIT

CROSS REFERENCE TO RELATED APPLICATIONS

The instant application claims priority to U.S. Provisional patent application 61/749,419 filed on Jan. 7, 2013, entitled SOFTWARE BASED APPLICATION SPECIFIC INTEGRATED CIRCUIT, the contents of which are incorporated by reference herein in its entirety.

BACKGROUND

1. Field of the Disclosure

The present invention relates to custom designed integrated circuits. More specifically, the present invention relates to a system and method for custom designing an integrated circuit that executes software in a manner that is consistent with the speed of hardware circuitry.

2. Background Information

In general, there are two types of custom designed integrated circuits. The first is the application-specific integrated circuit (ASIC). These chips are, quite literally, custom designed hardware circuits. They are extremely fast and utilize relatively low power.

A drawback is that the design process incurs enormous non-recurring engineering costs. Millions of dollars need to be expended before the first chip is even sold. The chip is also dedicated to its design purpose, and cannot be reconfigured for other uses.

The other primary type of custom designed integrated circuits is the field-programmable gate array (FPGA). FPGAs contain programmable logic components called "logic blocks", and a hierarchy of reconfigurable interconnects that allow the blocks to be "wired together"—somewhat like many (changeable) logic gates that can be inter-wired in (many) different configurations. Various computer tools are provided whereby a user can custom design a circuit using the tool. The tool will form the interconnections in the FPGA to execute the programmed circuit.

FPGAs have advantages over ASICs in that they have much lower non-recurring engineering costs, and are reconfigurable. However, FPGAs are significantly slower than ASIC chips, consume relatively high amounts of power, and have a high per unit cost.

The market currently does not have a configurable chip that can provide the advantages of both FGPAs and ASIC chips without the corresponding disadvantages.

In general, the design of software based processing has various limits on its processing speed. In contrast, hardware has far faster processing.

SUMMARY OF THE INVENTION

Embodiments herein provide a methodology for emulating hardware-like functionality on a programmable chip.

BRIEF DESCRIPTION OF THE DRAWINGS

These and other objects, features and advantages of the invention will be apparent from a consideration of the following Detailed Description of the Invention considered in conjunction with the drawing Figures, in which:

FIG. 25 is RESERVED.

DETAILED DESCRIPTION

It is to be understood that the figures and descriptions of embodiments of the present disclosure have been simplified to illustrate elements/steps relevant for a clear understanding of the present disclosure, while eliminating, for the purpose of clarity, other elements/steps found or used in typical presentations, productions, data delivery, computing systems, devices and processes. Those of ordinary skill in the art may recognize that other elements and/or steps are desirable and/or required in implementing embodiments of the present disclosure. However, because such elements and steps are well known in the art, and do not facilitate a better understanding of the present disclosure, a discussion of such elements/steps is not provided herein.

Embodiments of the invention herein provide a new custom design methodology that uses software on an integrated circuit to emulate the operability of hardware circuitry. Like an FPGA, the embodiments are reconfigurable and have low non-recurring engineering costs. Like an ASIC, they have high speed and consume relatively little power.

Figure 1:
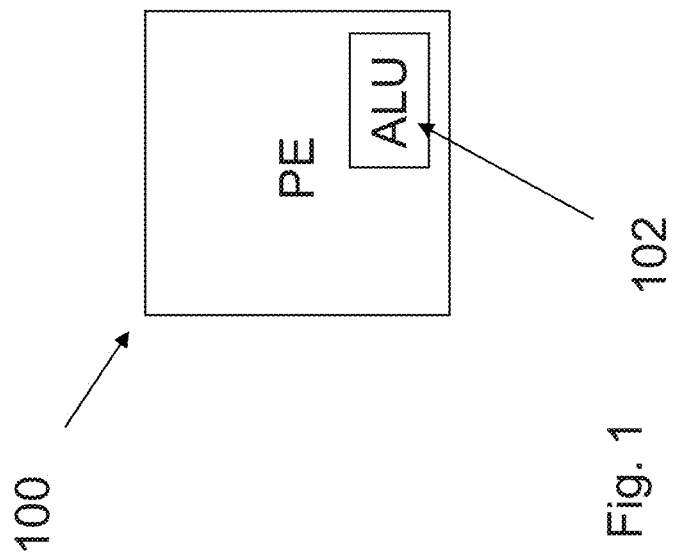
FIG. 1 shows a processing element according to an embodiment of the invention.

Referring now to FIG. 1, a processing element ("PE") 100 is shown. PE 100 is a basic building block of an integrated circuit according to an embodiment. It is similar to a basic microcontroller, and forms an individual processing module. PE 100 may be an 8-bit processing module, but the invention is not so limited; and it may be any desired size, including but not limited to 2-bit, 4-bit, 16-bit, 32-bit, etc.

As discussed in more detail below, PE 100 includes an arithmetic logic unit ("ALU") 102 to perform logical operations. However, PE 100 preferably does not perform mathematical operations.

By way of example in the context of this application, a logical operation is one in which the input bits can be considered and a result can be obtained without reference to other bits, regardless of the content of the bits that are operated upon. AND (^) and OR (*) operations are examples of logical operations.

In contrast, a mathematical operation is one in which input bits can be considered and a result may need to be obtained with the additional consideration of at least one other bit. Addition (+), or multiplication (−) are examples of mathematical operations, because the result may require reference to other bits.

The nature of the distinction between logical and mathematical operations can be seen in the following example. Consider the 4-bit word A of 0110, and the 4-bit word B of 0101. Consider now the logical operation of A AND B (A^B). The operation and the result can be viewed as follows:

| Bit: | 3 | 2 | 1 | 0 |
|---|---|---|---|---|
| A: | 0 | 1 | 1 | 0 |
| B: | 0 | 1 | 0 | 1 |
| A^B: | 0 | 1 | 0 | 0 |

In the above operation, each column of bits resolves without reference to another column of bits. Thus, in bit column zero, 0 AND 1 it results in 0 without reference to any bits in any other columns. This is the case for all columns regardless of what the particular bits are.

Consider now the mathematical operation of A plus B (A+B). Using the same A and B above, we get:

| Bit: | 3 | 2 | 1 | 0 |
|---|---|---|---|---|
| A: | 0 | 1 | 1 | 0 |
| B: | 0 | 1 | 0 | 1 |
| A + B: | 1 | 0 | 1 | 1 |

In the above example, resolution of this particular value of A and B requires at least some consideration of other bits. Specifically, bit column 2 results in 1+1=2. Since bits are in binary, this results in zero in bit column 2 and a carry over of one (1) into bit column 3. To reach the result in bit column 3, the operation required consideration of not only the values of A and B in bit column 3, but any carryover from bit column 2. In this manner, the operation of addition can thus require consideration of other bits.

It is noted that generic mathematical operations are not value dependent. For example, consider the addition of 0000+0000=0000. Processing of any two (2) bits provides a result (zero) without reference to other bits. From the perspective of the processing of the data, this operation appears as a logical operation, in that there is no consideration of other bits. Addition is nonetheless a mathematical operation because it could potentially be called upon to rely upon other bits based on the values. The system that performs the addition should be constructed to account for that possibility. Thus, a component that performs the mathematical operation of generic addition should be structured to account for that possibility.

It is noted that there may be exceptions in which a specific mathematical function could be considered a logical function. One such possible exception is when the data subset that it would consider would be known to require only consideration of input bits without reference to other bits. For example, as discussed above, generic addition is a mathematical function because of the possibility of carryover for the sum of 1+1=2. However, if it were known at the programming level that a limited data set would be presented for addition that would not induce carryover (e.g., 0+0, 0+1, 1+0, but not 1+1), then this function could meet the definition of a logic operation and could be assigned to a PE 100 for processing.

Another example is the function A≠B, which can be built with extremely fast hardware and thus accommodated into a PE 100.

Figure 2:
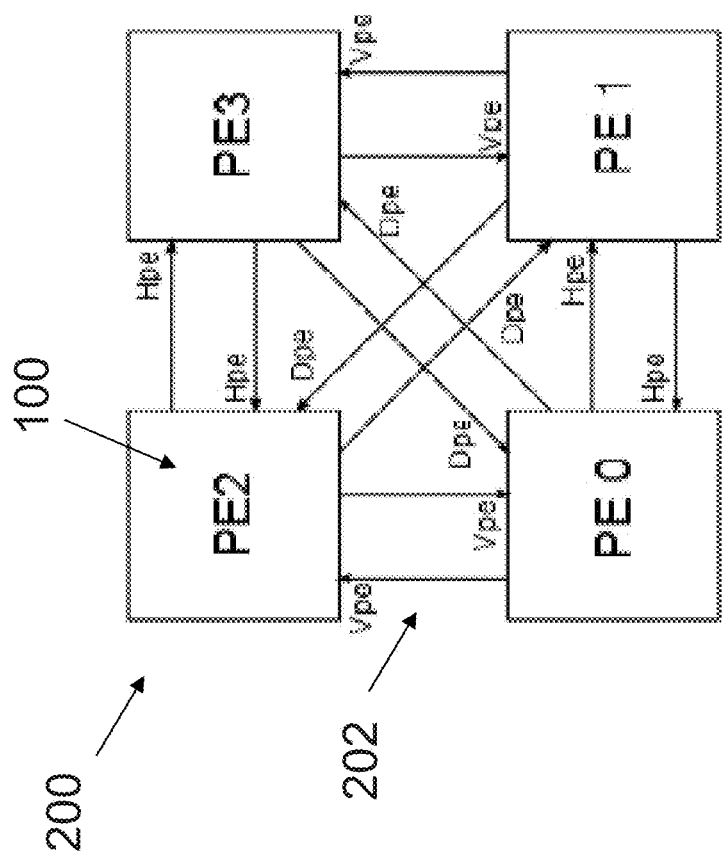
FIG. 2 shows a group of processing elements according to an embodiment of the invention.

Referring now to FIG. 2, each PE 100 is preferably assigned into groups 200. The embodiment of FIG. 2 shows four PE 100s (PE0, PE1, PE2, PE3) assigned to group 200. The assignment of four PE's 100 to a group 200 may provide certain advantages compared with other numbers, but the invention is not limited to four per group.

In the embodiment of FIG. 2, each PE 100 forms a "positional pair" with another PE 100 based on relative orientation. Thus, each PE 100 forms a first horizontal positional pair with a horizontal neighbor, a second vertical positional pair with a vertical neighbor, and a third diagonal positional pair with a diagonal neighbor. For example PE0 has a vertical pair relationship with PE2, a horizontal pair relationship with PE1, and a diagonal pair relationship with PE3.

Each PE 100 within group 200 preferably has bidirectional communication with every other PE 100 in the group through pathways 202. Pathways 207 are labeled according to their pair relationship. Thus for example the communication between vertical pair PE0 and PE2 is designated Vpe. In this configuration, each PE 100 has full connectivity with all of the other PEs within the group 200. Each PE 100 can access the result of any other PE within the group 200. Each PE 100 can swap data with other PEs 100 within the group 200. As discussed below, PEs 100 within a group can also be used collectively to support mathematical operations.

FIG. 2 also shows the preferred physical matrix orientation of the PEs 100 within group 200. This particular matrix layout provides the overall minimum distance between PEs 100, which improves the potential processing speed of group 200. However, other configurations could also be used, although with a possible corresponding potential reduction in speed based on longer distances between PEs 100.

Figure 3:
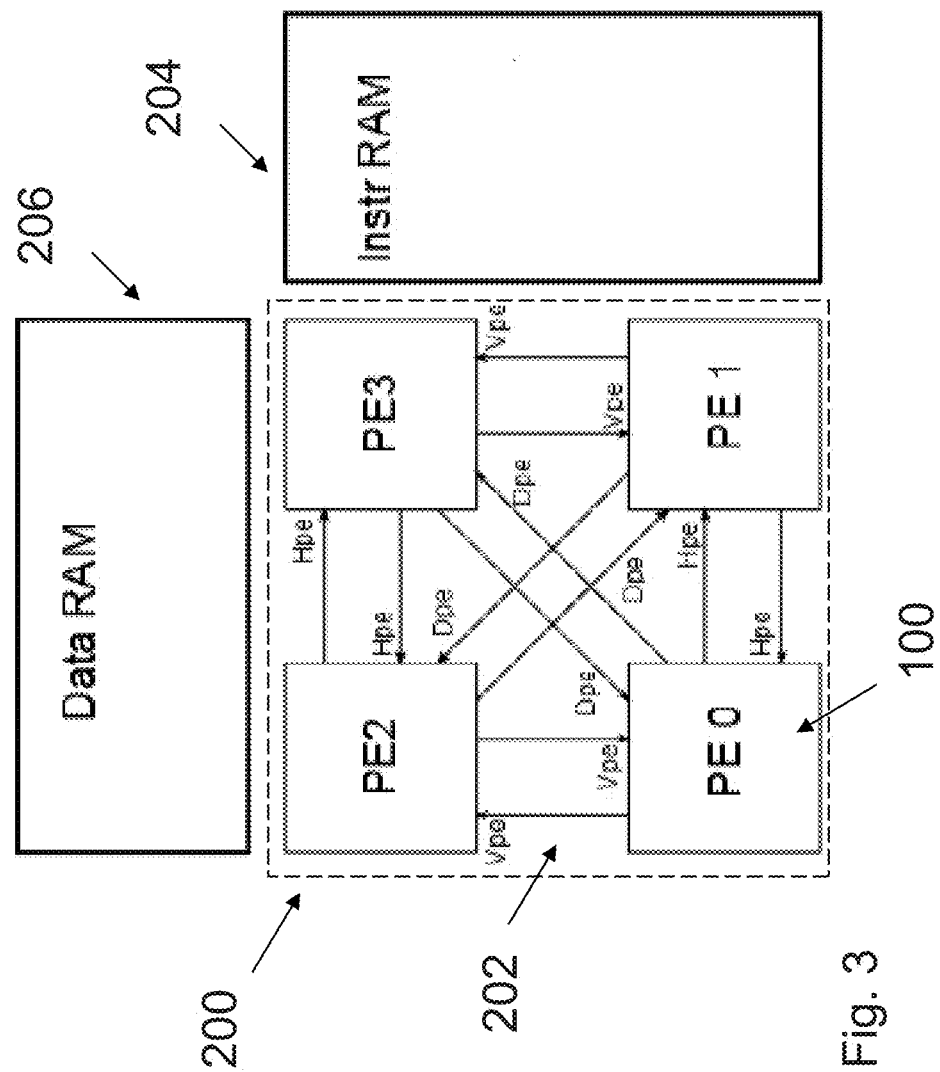
FIG. 3 shows a group of processing elements with associated data storage and instruction storage according to an embodiment of the invention.

Referring now to FIG. 3, group 200 is preferably associated with an instruction storage 204 and a data storage 206. Storages 204 and 206 may be a RAM, either alone or in combination with other elements to support the functions of the RAM (collectively "RAM"), such as a random access memory (RAM). The nature and relationship of instruction storage 204 and data storage 206 are discussed in more detail below.

Figure 4:
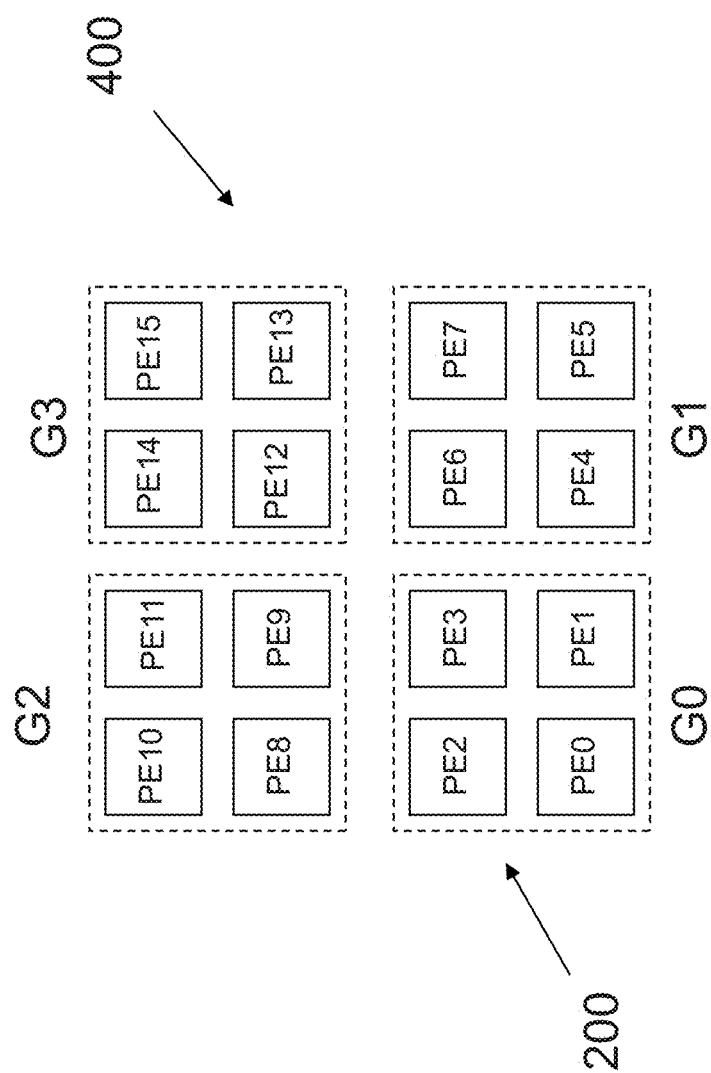
FIG. 4 shows a cluster of groups of processing elements according to an embodiment of the invention.

Referring now to FIG. 4, several groups 200 of PEs 100 form a cluster 400. The embodiment of FIG. 4 shows four groups 200 (G0, G1, G2, G3) assigned to cluster 400. The assignment of four groups 200 to a cluster 400 may provide certain advantages compared with other numbers, but the invention is not limited to four per cluster.

FIG. 4 also shows the preferred physical orientation of the groups 200 within cluster 400, although the invention is not limited to such configuration.

PEs 100 in different groups 200 within cluster 400 preferably form "conjugate pairs" with commonly situated PEs in different groups. Conjugate pairs are PEs 100 that share the same physical orientation within the groups 200 of the cluster 400.

Figure 5:
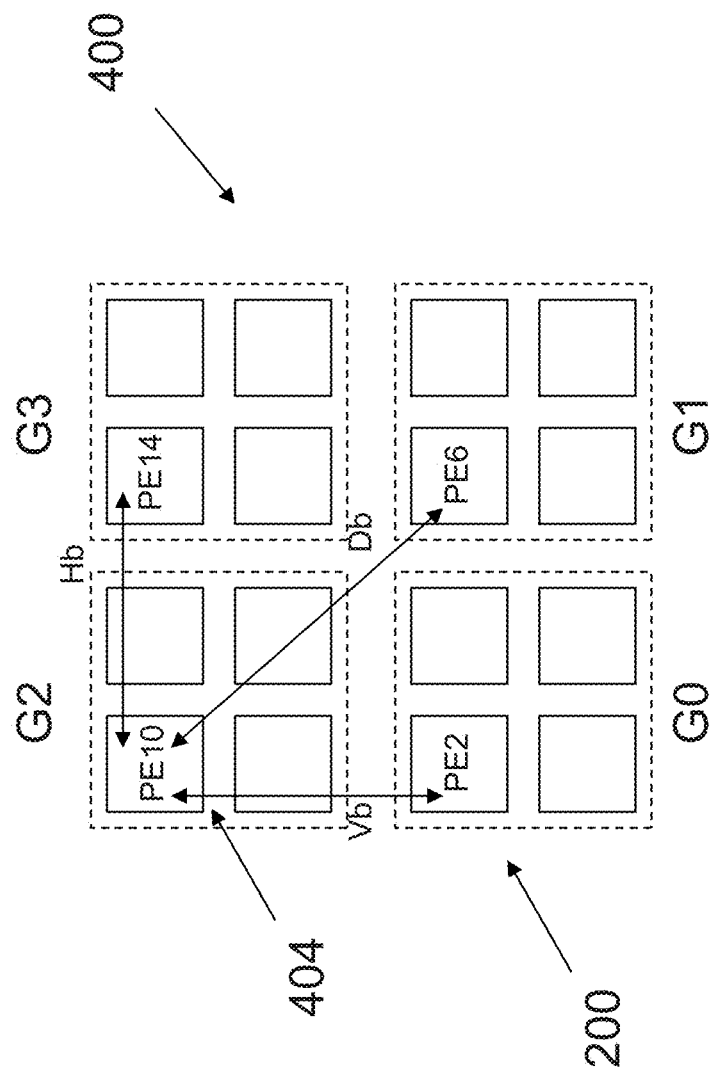
FIGS. 5 and 6 show examples of communications between conjugate pairs of processing elements within different groups.

For example, referring now to FIG. 5, PE2 is the upper left most PE 100 within group G0 of cluster 400. PE6, PE10, and PE14 share that same position in the other groups 200. PE2, PE6, PE10, and PE14 will thus form 4 different conjugate pairs on vertical, horizontal and diagonal basis (Vb, Hb and Db, respectively) through which the PEs 100 can communicate with each other.

Thus, as shown in FIG. 5, the top left PEs 100 within group G2 of cluster 400 can bidirectionally communicate with every other top left PE 100 within the other groups 200 of cluster 400. PE10 can communicate with its vertical pair PE2, with its diagonal pair PE6, and its horizontal pair PE14.

Figure 6:
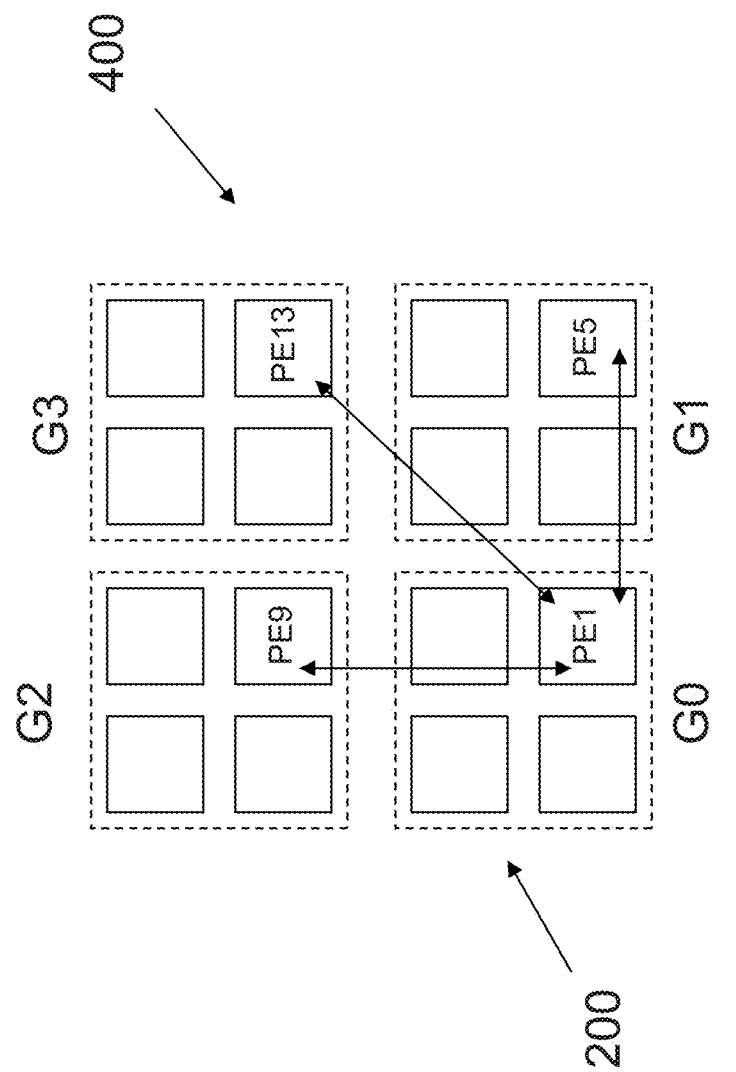

In another example as shown in FIG. 6, lower right PE1 can communicate with its vertical pair PE9, horizontal pair PE5, and its diagonal pair PE13.

It is to be understood that the remaining fourteen (14) PEs 100 within the cluster 400 of the embodiment have similar connections consistent with the principles discussed above, and are not separately described herein. Preferably each PE 100 does not communicate with other PEs in other groups 200 within cluster 400 other than as discussed herein. However, the invention is not so limited, and other such connections may exist.

Figure 7:
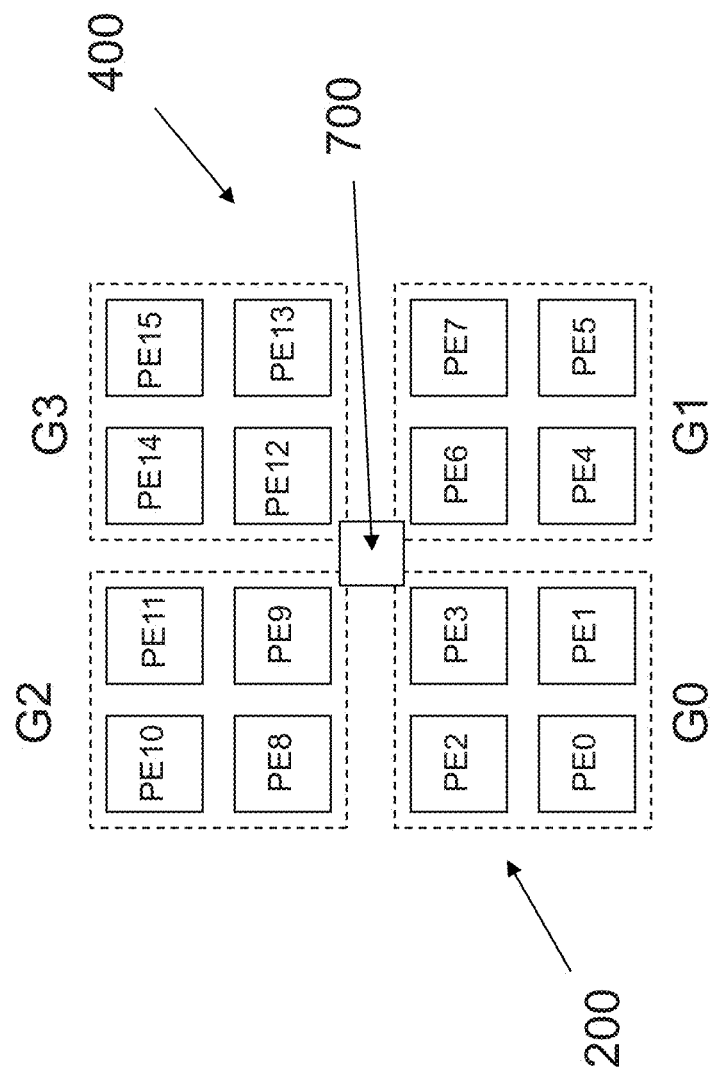
FIGS. 7, 7A and 7B show examples of the relationship between a cluster and a switch according to an embodiment of the invention.

Referring now to FIG. 7, communications to and from each cluster 400 preferably routes through a switching element 700. The switching element 700 may be a 32 bit switch to provide a single bit input and output to each PE 100 in cluster 400, but this need not be the case and the invention is not so limited. Each of the PEs 100 may connect to switching element 700, and under such an embodiment would exchange information with the outside environment solely through switching element 700.

Figure 7A:
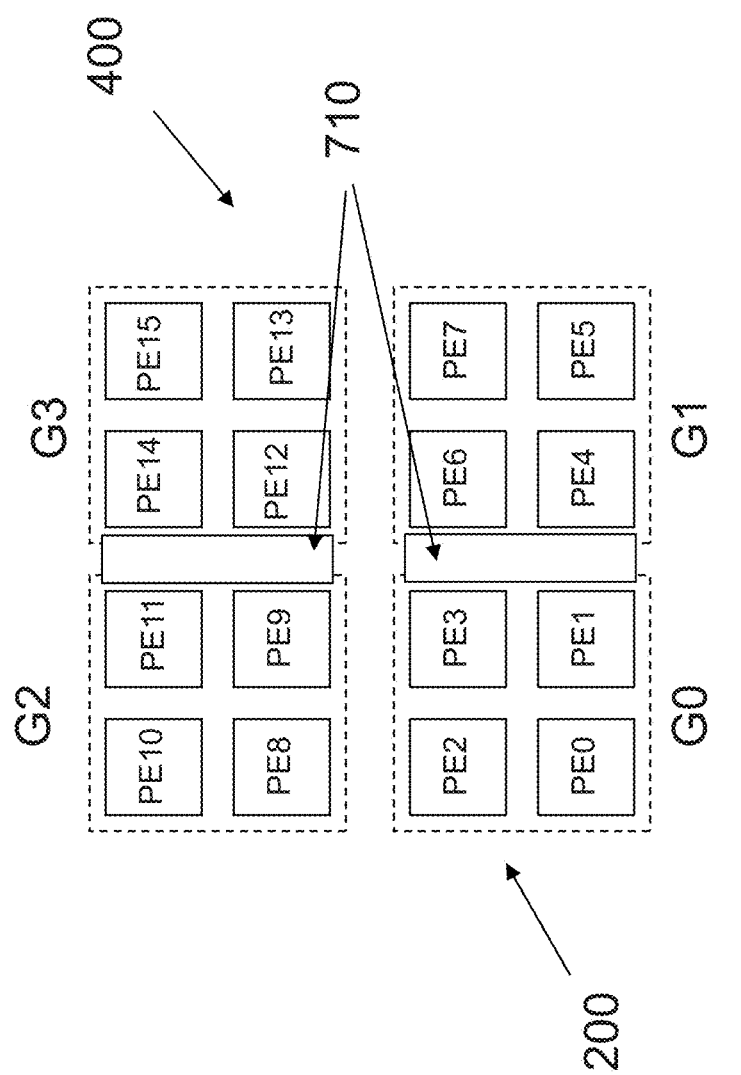

Referring now to FIG. 7A, as noted above switching element 700 may be made of sub-elements. FIG. 7A shows an embodiment in which switching element 700 is made of two sub-switching elements 710. In an embodiment in which cluster 400 includes four groups 200, each sub-switching element is the pathway for communications with two of the four groups. In FIG. 7A, the lower sub-switching element 710 handles groups G0 and G1, while the upper sub-switching element 710 handles groups G2 and G3. Other configurations could also be used. It is to be understood that switching element 700 as shown in the figures, such as FIG. 7, is generic to any such switching configuration unless noted otherwise.

Each switch 700 has a portion of its operations (referred to herein as "portions", although it is to be understood that the portions do not necessarily refer to physical portions) devoted to one of the PEs 100 within each group.

Figure 7B:
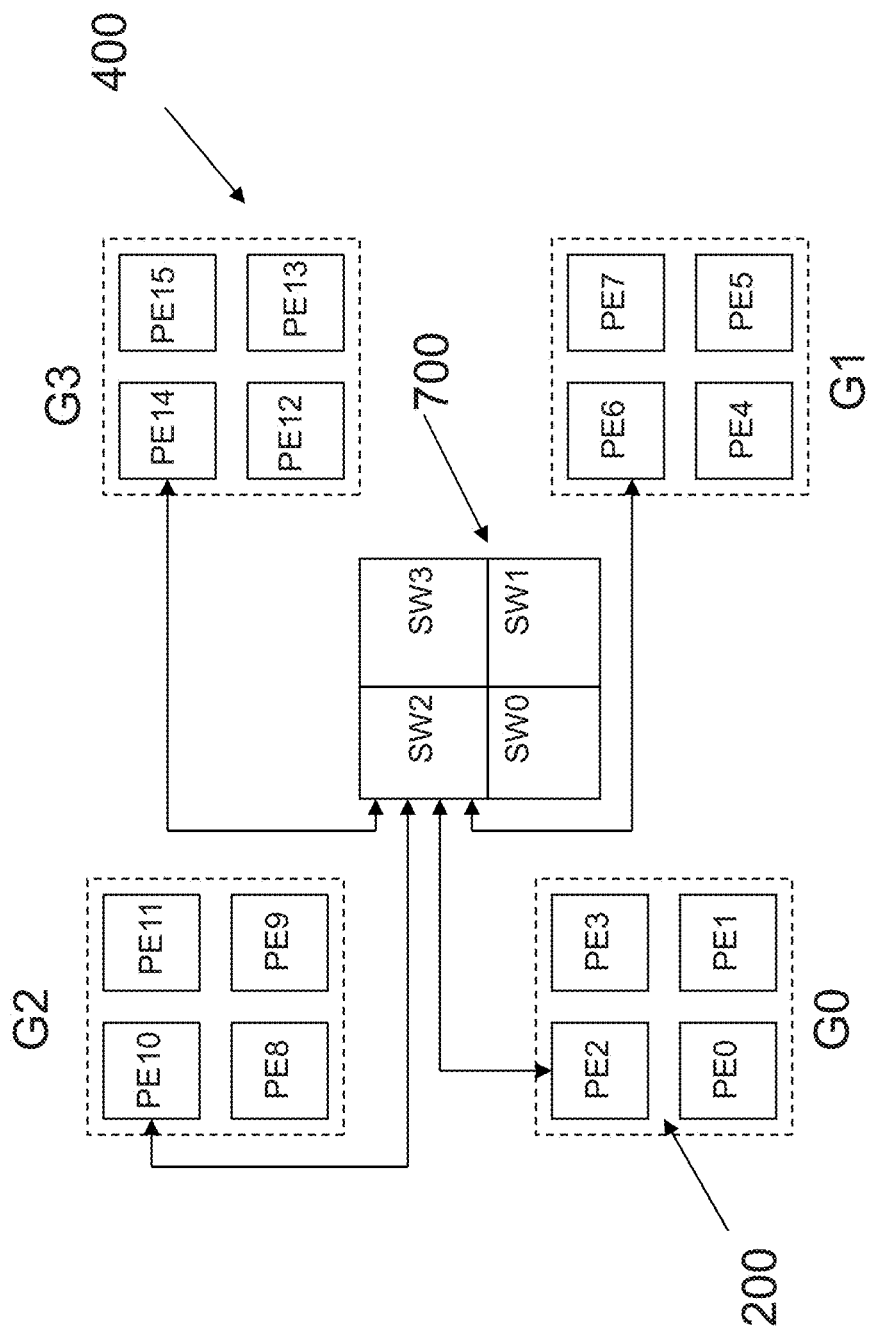

Referring now to FIG. 7B, which is an exploded version of FIG. 7, switch 700 has four (4) portions SW0-SW3. As discussed above, groups 200 within cluster 400 preferably communicate through conjugate pairs of commonly placed PEs 100 on vertical, horizontal and diagonal basis (Vb, Hb and Db, respectively). Preferably the corresponding portion of the switch 700 similarly communicates only with the PE's within those conjugate pairings of commonly placed PEs 100. In FIG. 7B, portion SW2 of switch 700 connects to PE2 and its common pairs PE6, PE10, and PE14 that share the same physical orientation in other groups. The remaining portions of switch 700 similarly connect with their corresponding pairs in the groups.

As discussed in more detail below, switch 700 may be its own processing element, and would operate under control of instruction storage 204.

Figure 8:
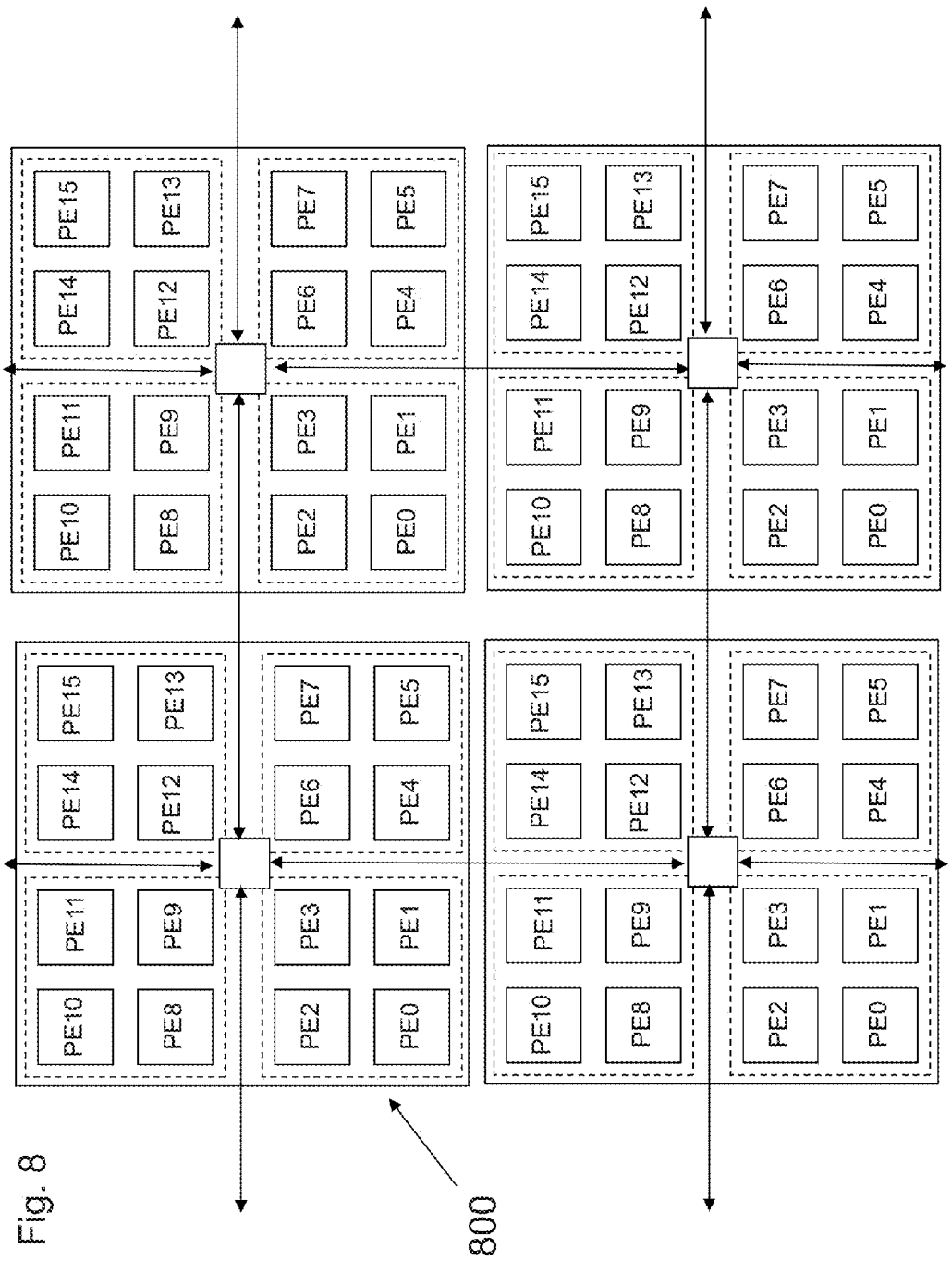
FIG. 8 shows the interaction of several clusters according to an embodiment of the invention.

Referring now to FIG. 8, the larger circuit 800 is defined by multiples of clusters 400. The clusters 400 are connected in parallel by the switching elements 700. The switching elements 700 preferably communicate through their common portion, e.g., SW2 of one switching element 700 would only communicate with switching element SW2 of another switching element 700. This establishes a concept of byte lanes that will extend from the switches 700 to higher and lower stages of the architecture. The byte lanes are preferably the same word size as the bits of each PE 100.

Four clusters 400 are shown in FIG. 8, but in practice larger circuit 800 could support as many clusters 400 as desired.

Clusters 400 may further be organized into independent groups. A higher layer switch fabric may connect the clusters 400 to each other within the group, preferably using the same or similar methodology as the switch fabric defined by switching elements 700 in FIG. 8. However, other switch fabrics may be used. The independent groups of clusters 400 may themselves be connected by a still higher layer switch fabric, preferably using the same or similar methodology as the switch fabric defined by switching elements 700 in FIG. 8.

Figure 10:
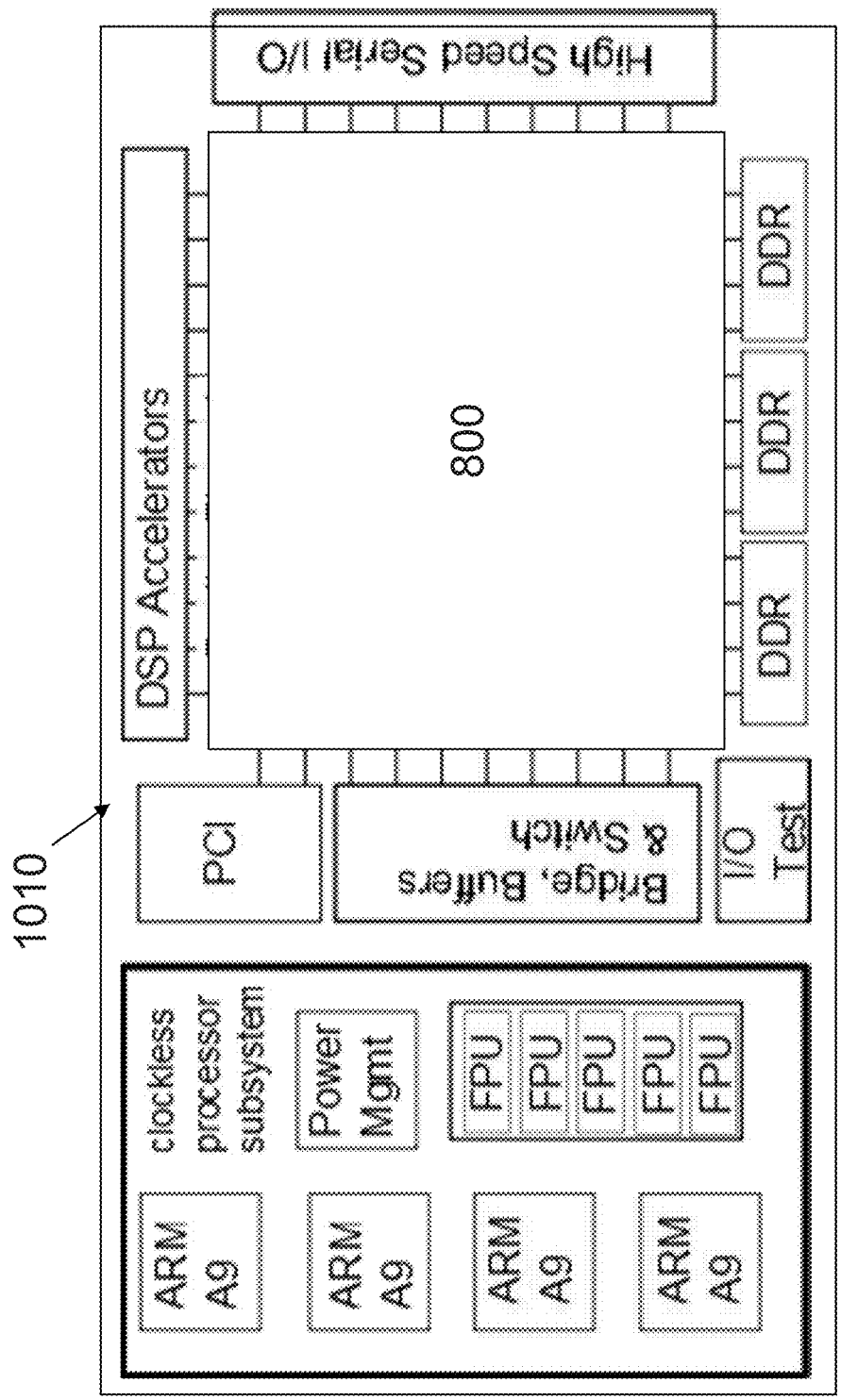
FIG. 10 shows an integrated circuit according to an embodiment of the invention.

Referring now to FIG. 10, a larger circuit 800 of clusters 400 and associated typical surrounding hardware (e.g., input/output connection) preferably form the SD-ASIC chip 1010.

Each PE 100 within SD-ASIC 1010 is preferably the same size to promote uniformity of design and operation. For ease of discussion, the embodiments herein are referred to as if all of the PEs 100 are the same size and design. However, the invention is not so limited, and it is to be understood that PEs 100 may have different sizes and/or designs.

Each PE 100 is its own mini-processor, configured to operate as one processor consistent with its size (e.g., 8 bits) that executes logical operations. If larger machines for logical operations are needed, then PEs 100 can cooperate to combine their individual processing power into larger machines. Thus, within any particular group 200, any number of PEs 100 can combine to form a machine of their combined size. By way of non-limiting example, if each PE 100 is an 8-bit processor, then four (4) PEs 100 working collectively within a group 200 can form a 32-bit processor. Two groups 200 can combine together to form a 64-bit processor. Individual PEs 100 could work across groups 200, and potentially across clusters 400 and even super clusters 900, to similarly combine.

As a practical matter, there may be an upper limit on the number of PEs 100 that can combine in this manner. By way of non-limiting example, 64 bits may be the largest machine that can be formed, but the invention is not so limited, and other limits (or no limits at all) may be used. If a limit is present, then processing that would require a larger machine would be addressed at the software level to break the processing down into chunks that could be operated on by sets of PEs 100, possibly along with other PEs 100 directed to processing the results of the chunks into the larger result.

Figure 12:
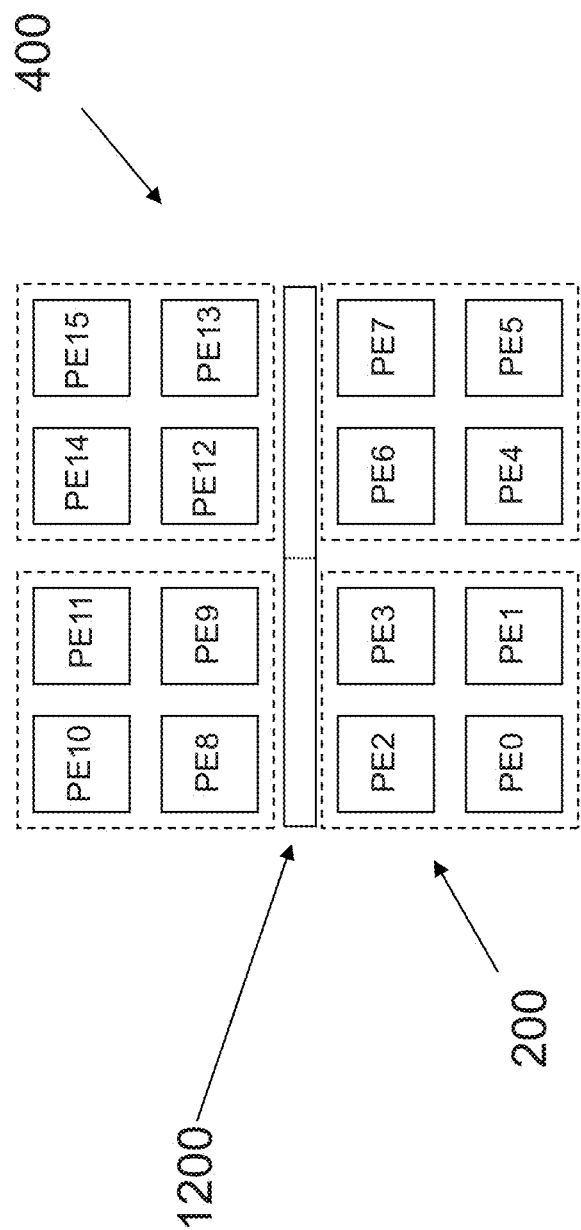
FIG. 12 shows the architectural relationship between the processing elements within a cluster and a multi multiword arithmetic unit according to an embodiment of the invention.

Referring now to FIG. 12 as discussed above, the various PEs 100 may perform logical operations, but preferably not mathematical operations. To provide mathematical operations, a multi-word arithmetic logic unit 1200, which may be made of subgroups, is provided in each cluster 400. Multi-word arithmetic logic unit (MWU) 1200 is preferably a reconfigurable arithmetic coprocessor, although the invention is not limited thereto.

MWU 1200 provides mathematical operation capabilities, including but not limited to addition, multiplication, and shift (left or right). The logical operations of PEs 100 and the mathematical operations of MWU 1200 collectively provide the same capabilities of any prior art processing element that provides both of these operations, but with significantly enhanced speed.

Specifically, prior art logic elements have been designed to provide both logical operations and mathematical operations. The mathematical operations are the more resource demanding of the two, requiring more area, power, and time to process. Further, the slower speed of the mathematical operations tends to control the overall speed of the processor.

Yet from a programming perspective of some embodiments herein, there tend to be far more logical operations than mathematical operations. Thus, the processing speed of the majority of operations is limited by the processing speed required for the minority operations.

The division of logical operations into the PEs 100 and mathematical operations into MWU 1200 disassociates the logic operations from the physical limitations of the mathematical operations. PEs 100 can thus operate at significantly higher speeds than MWU 1200, and can (particularly when leveraged with various other embodiments herein) approach or reach the processing speed of electronic hardware. Since the majority of executable software is made up of logical operations which can be executed at this speed, the overall processing speed of cluster 400 far exceeds that of typical processing chips that execute software.

MWU 1200 preferably does not provide any logical operations, as the PEs 100 provide that functionality. However, this need not be the case as MWU 1200 may be configured to perform, and may in fact perform, some logical operations, although this may result in some reduction of overall processing speed.

Figure 13:
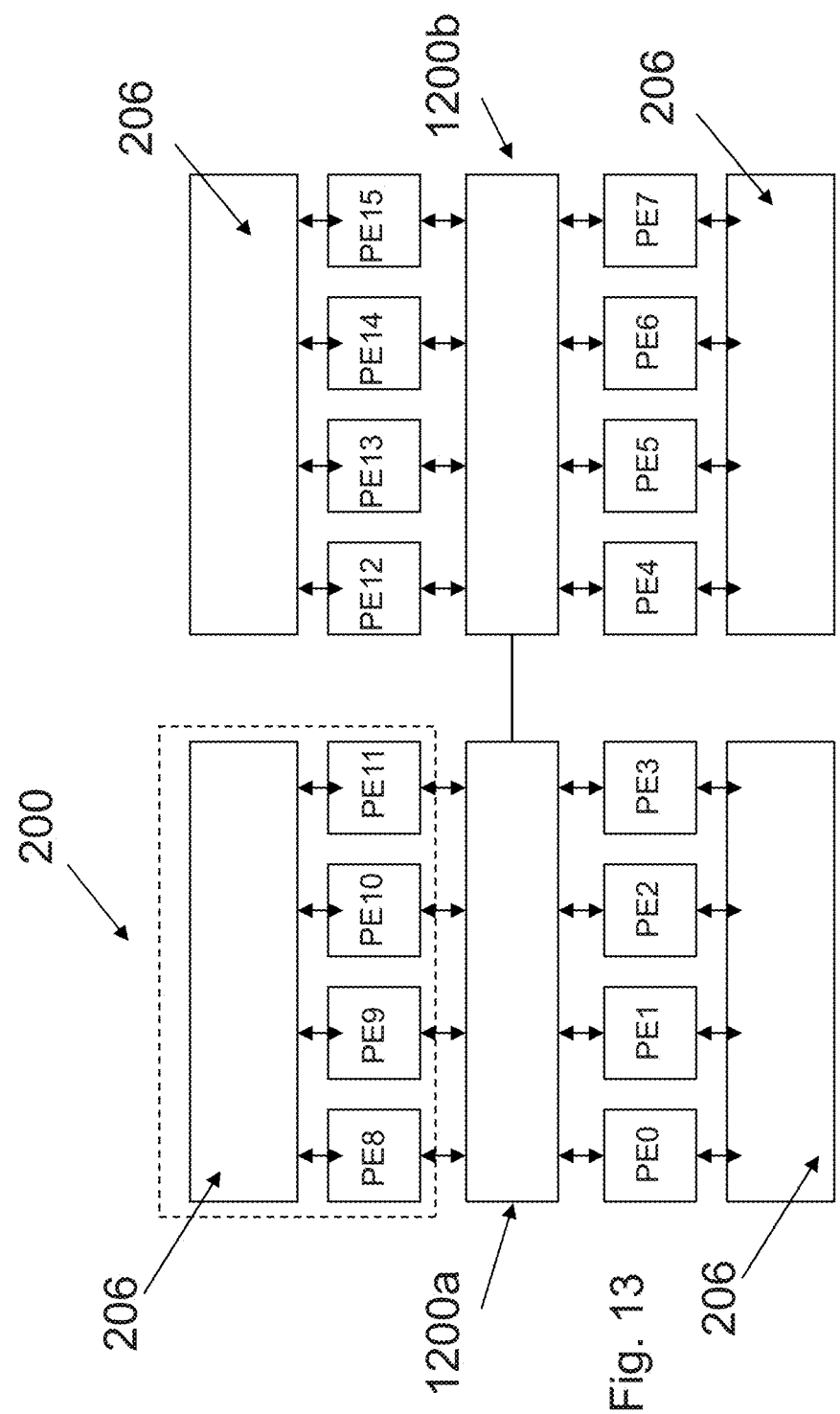
FIGS. 13-15 show the logical relationship between the processing elements within a cluster and a multi word arithmetic unit according to an embodiment of the invention.

Referring now to FIG. 13, the cooperation between the PEs 100 and the MWU 1200 within a cluster 400 is shown at a logical level. The individual data storage 206 for each group 200 is also shown for reference.

Figure 14:
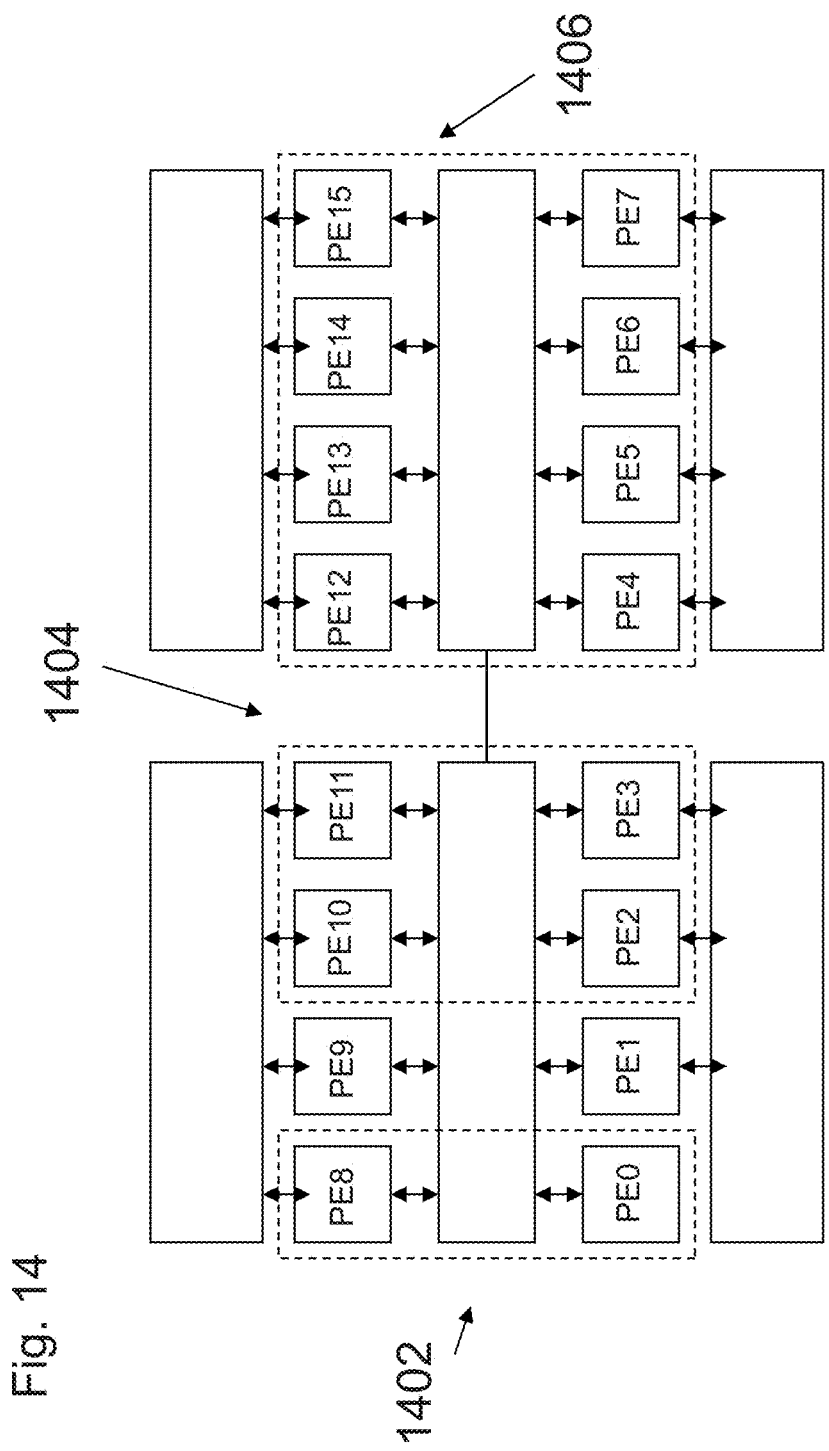

The execution of mathematical operations calls for cooperation between PEs 100 in different groups 200, typically between conjugate pairs. Thus, referring now to FIG. 14, to perform a basic mathematical operation, two conjugate pair PEs 100 from two different groups combine with a portion of MWU 1200 to form a miniature combined logical/mathematical unit 1402. FIG. 14 shows PE0 and PE8 in this configuration, but any conjugate pair of PEs 100 could be used. The individual PEs 100 provide the input data, the portion of MWU 1200 performs the mathematical operation, and the results are provided to one or both of the PEs 100 that provided the input data.

By way of non-limiting example, suppose the mathematical operation is A+B=C. In the machine 1402 of FIG. 14, PE0 provides A to MWU 1200, and PE8 provides B to MWU 1200. MWU 1200 performs the addition and calculates C. MWU then provides C back to PE0 and/or PE8 that provided the input.

Machine 1402 is the smallest mathematical processor that can be created, and is consistent with the size of the PEs 100. Thus, if PEs 100 are 8-bit processors, then machine 1402 is an 8-bit machine.

As with the individual PEs 100, the formation of the mathematical/logical machines is scalable based on the needs of the design. Machine 1404 uses four (4) PEs 100 and MWU 1200 to form a machine twice the size of machine 1406. Machine 1406 uses two (2) entire groups 200 with sixteen (16) PEs 100 to form a machine twice the size of machine 1404 and four times the size of machine 1402. Indeed, an entire cluster 400 could be combined to form a machine eight times the size of machine 1402. If the PEs 100 are 8-bit machines, then the cluster 400 in its entirety can form a 64-bit machine for mathematical/logical operations.

Figure 15:
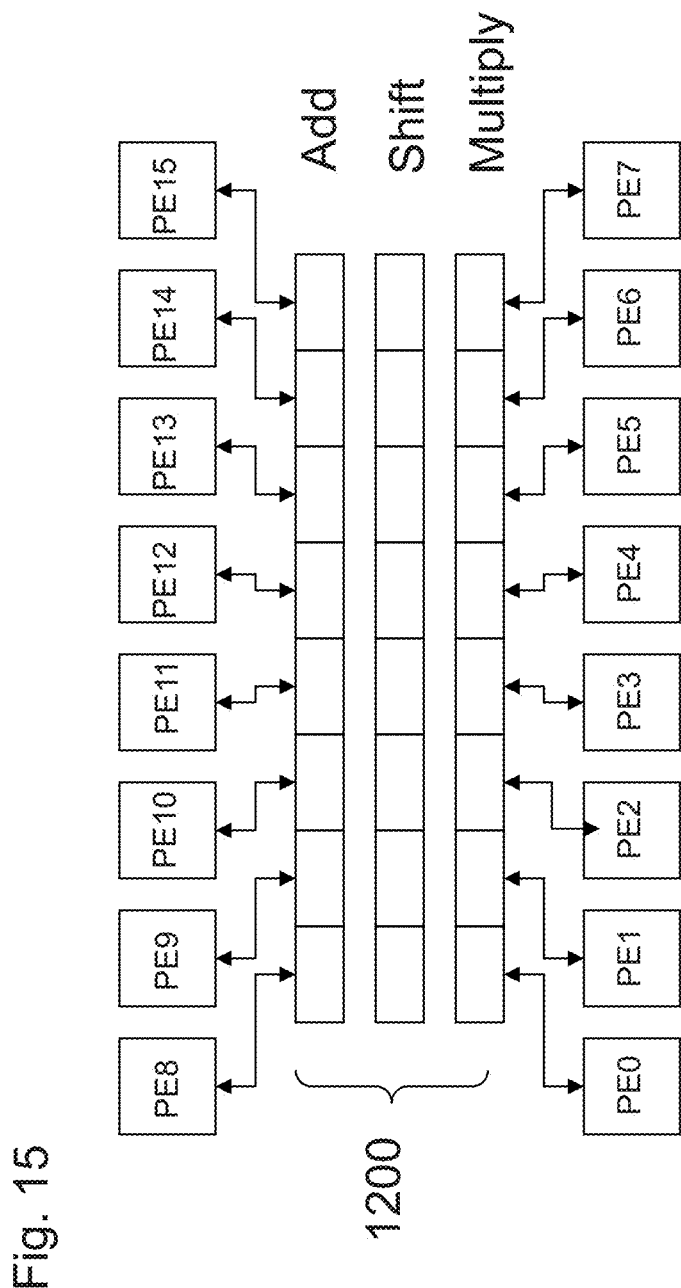

FIG. 15 shows a more detailed version of the MWU 1200 in relation to the cluster 400, MWU 1200 may be organized into three sub-units, one each for addition, multiplication, and shifting. These collectively can provide the nine basic mathematical operations of operations: ADD (addition), SUB (subtraction), MUL (multiplication), SMUL (signed multiplication), CLT (compare less than), SCLT (signed compare less than), LS (left shift), RS (right shift), ARS (arithmetic right shift).

Each sub-unit is subdivided into a number of stages equal to the number of PEs 100 in half of the cluster; in FIG. 15, this is eight (8) stages. Each stage receives input from and sends output to a matched pair of PEs, one from each half of the cluster, The stages of a sub-unit can be used individually for single-byte arithmetic, ganged together into a 64-bit operation, or in any combination of multi-byte arithmetic that fits into 64-bits.

Figure 16:
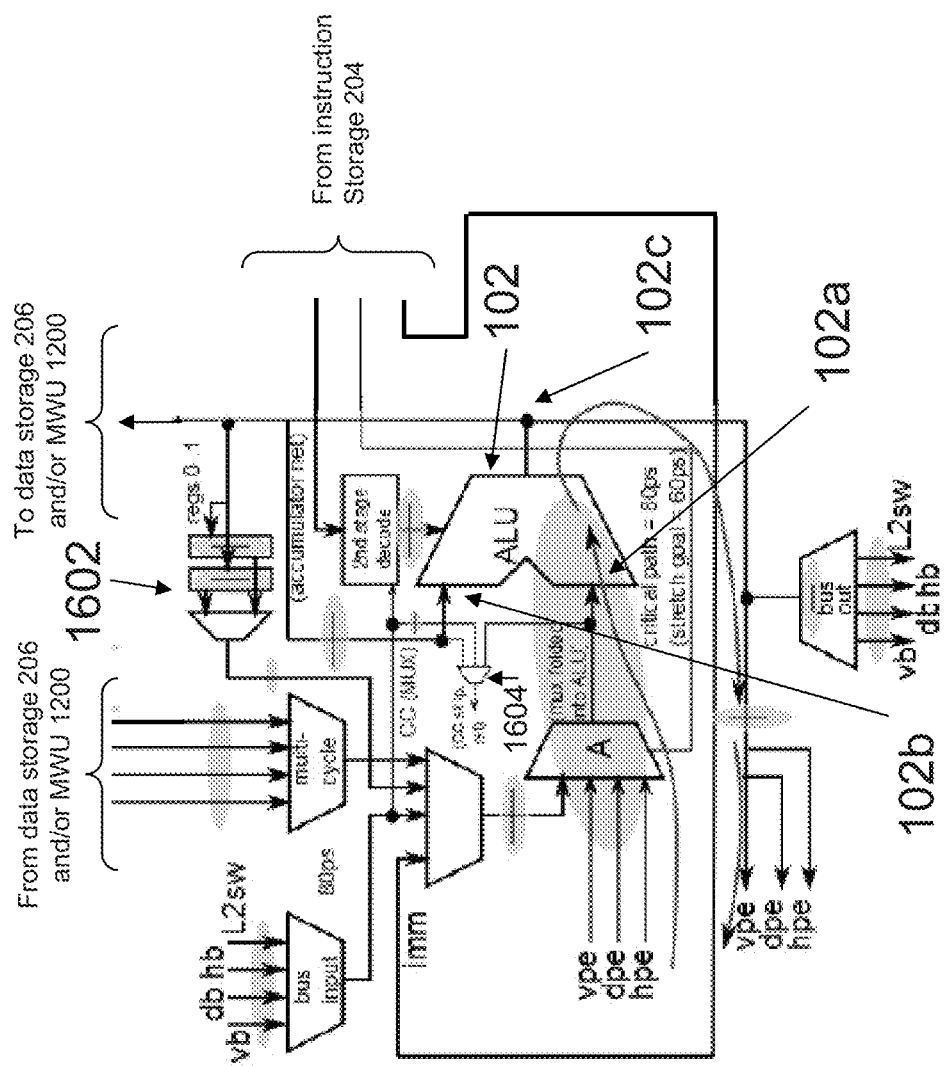
FIG. 16 shows a more detailed view of a processing element according to an embodiment of the invention.

FIG. 16 shows a more detailed view of aspects of a PE 100 and its relationship with data storage 206, instruction storage 204, and other components discussed herein. The central component is the ALU 102. In the embodiment of FIG. 16, ALU 102 has two inputs 102a and 102b, and one output 102c. ALU 102 also receives instruction commands from an instruction decoder, which itself receives instructions from instruction storage 204 and/or switch 700 ("L2SW").

Input 102a branches through a variety of paths to provide ALU 102 of PE 100 with a variety of possible inputs. Input can be received from (1) the positional paired PE 100s within its group (Vpe, Dpe, and Hpe as shown in FIGS. 2 and 3), (2) the conjugate paired PEs 100 from other groups 200 within the cluster 400 (Vb, Db, and Hb and shown in FIGS. 5 and 6), (3) the switch 700, (4) the output of the MWU 1200, (5) a delayed circuit 1602 (which provides a delayed version of the output 102c of ALU 102, (6) a code value (imm) provided directly from the instruction storage 204, and (7) data from data storage 206. However, the invention is not so limited, and other inputs may be provided as appropriate.

For ease of design, the potential various input signals are fed to input 102a through a variety of multiplexers, either standalone or in cascade format (where the output of one multiplexer feeds another multiplexer). The various multiplexers are under the control of the instruction storage 204, although only one such control signal is shown in FIG. 16 for multiplexer A.

Output 102*c* branches off in multiple directions, including back into input 102*b* through a delay element (shown as a perpendicular line). This collectively forms a feedback loop. ALU 102 is thus configured as an accumulator machine, in that one input 102*b* for any given instruction is always the value of the ALU 102 that was set on the previous instruction. The other input 102*a*, if required, is selected from any of the various data paths to input 102*a* discussed above.

Output 102*c* branches through a variety of paths to make the output available to a variety of circuit components. One such branch, as discussed above, is fedback into input 102*b* of ALU 102. Other branch paths make the output 102*c* available to: (1) the positional paired PE 100s within its group (Vpe, Dpe, and Hpe as shown in FIGS. 2 and 3), (2) the conjugate paired PEs 100 from other groups 200 within the cluster 400 (Vb, Db, and Hb and shown in FIGS. 5 and 6), (3) the switch 700, (4) the MWU 1200, (5) a delay/hold circuit 1602, and (6) data storage 206.

Delay/hold circuit 1502 is a collection of registers and a multiplexer that can store and provide prior values of the output 102*c* of ALU 102 for later use.

A multiplexer 1604 is also provided to produce a command code CC that can be used for various purposes. One such purpose is to dynamically interface the PE 100 and instruction storage 204, discussed below.

The design of PE 100 relative to other PEs preferably has a critical path as small as possible. Using currently available technology, PEs 100 configured as shown in FIGS. 2, 3 and 16 can achieve critical paths of 80 pico seconds. With continued improvements in the underlying components, a critical path of 60 pico seconds is possible.

Figure 17:
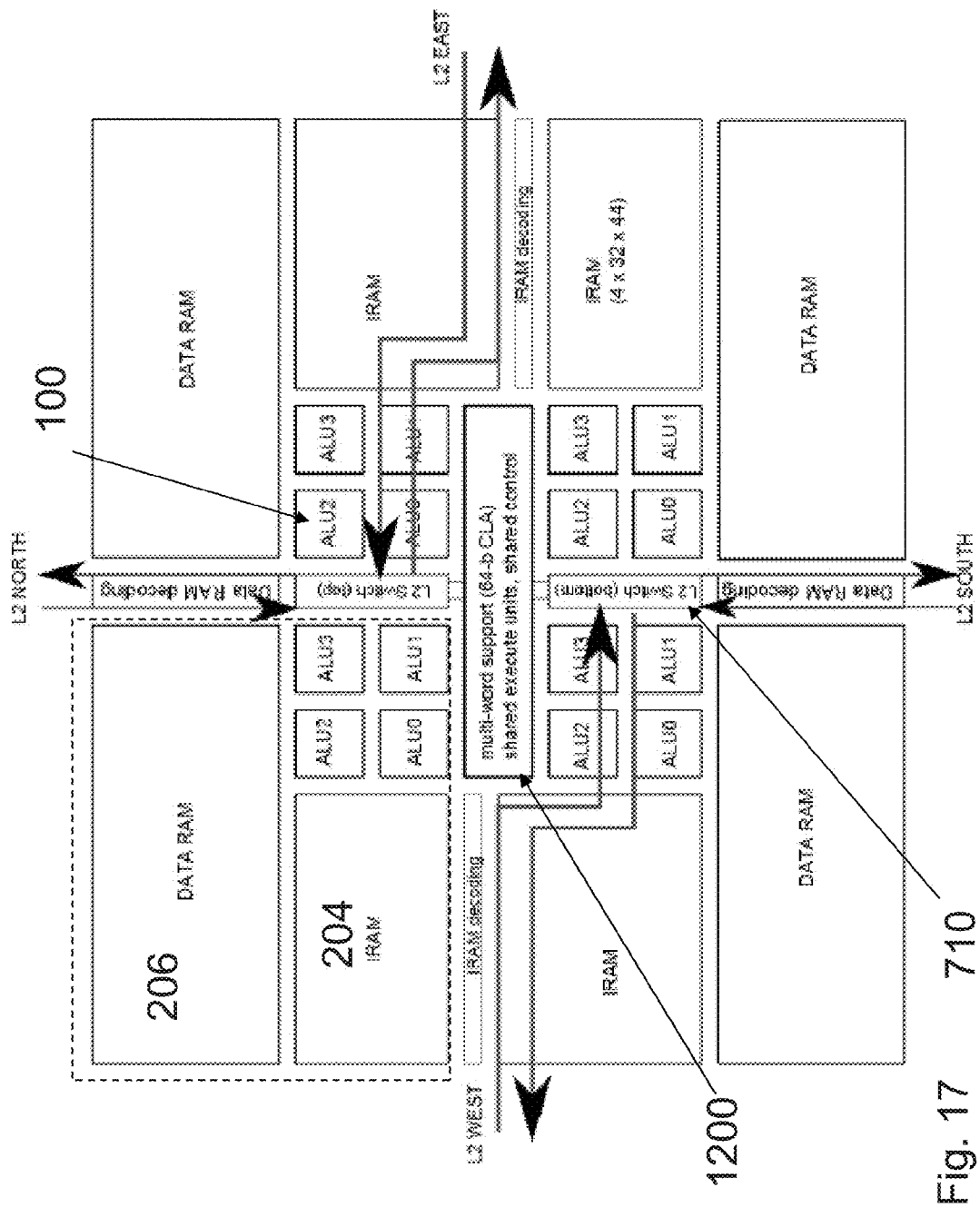
FIG. 17 shows an architecture of a cluster according to an embodiment of the invention.

FIG. 17 shows the architectural layout of the components of a cluster 400. The PEs 100 (shown as "ALU") within the groups 200 are as close to the center as possible, and surrounded by the data storage 206, instruction storage 204, MWU 1202, switches 700/710, and other supporting components. This configuration optimizes the processing speed of the cluster 400.

Figure 18:
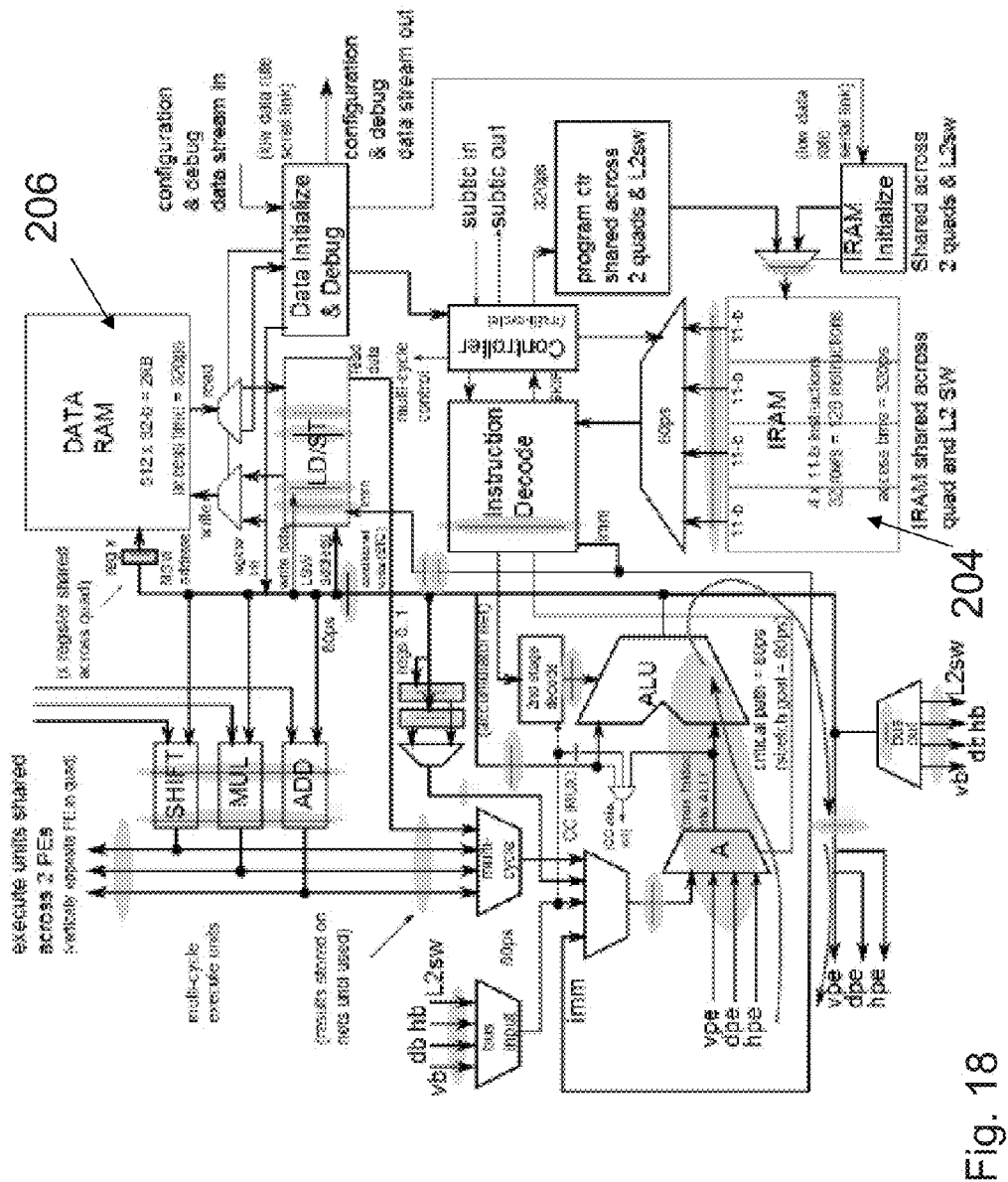
FIG. 18 shows a more detailed view of a processing element interacting with other components within a cluster according to an embodiment of the invention.

FIG. 18 shows an embodiment with various connections of the PE 100 as shown in FIG. 16 with other components within cluster 400.

As discussed above, each group 200 has corresponding data storage 206, which may be a data RAM. For ease of discussion, reference is made to herein as data RAM 206 (which may be RAM, either alone or with supporting elements), although it is to be understood that other storage may be used.

Figure 19:
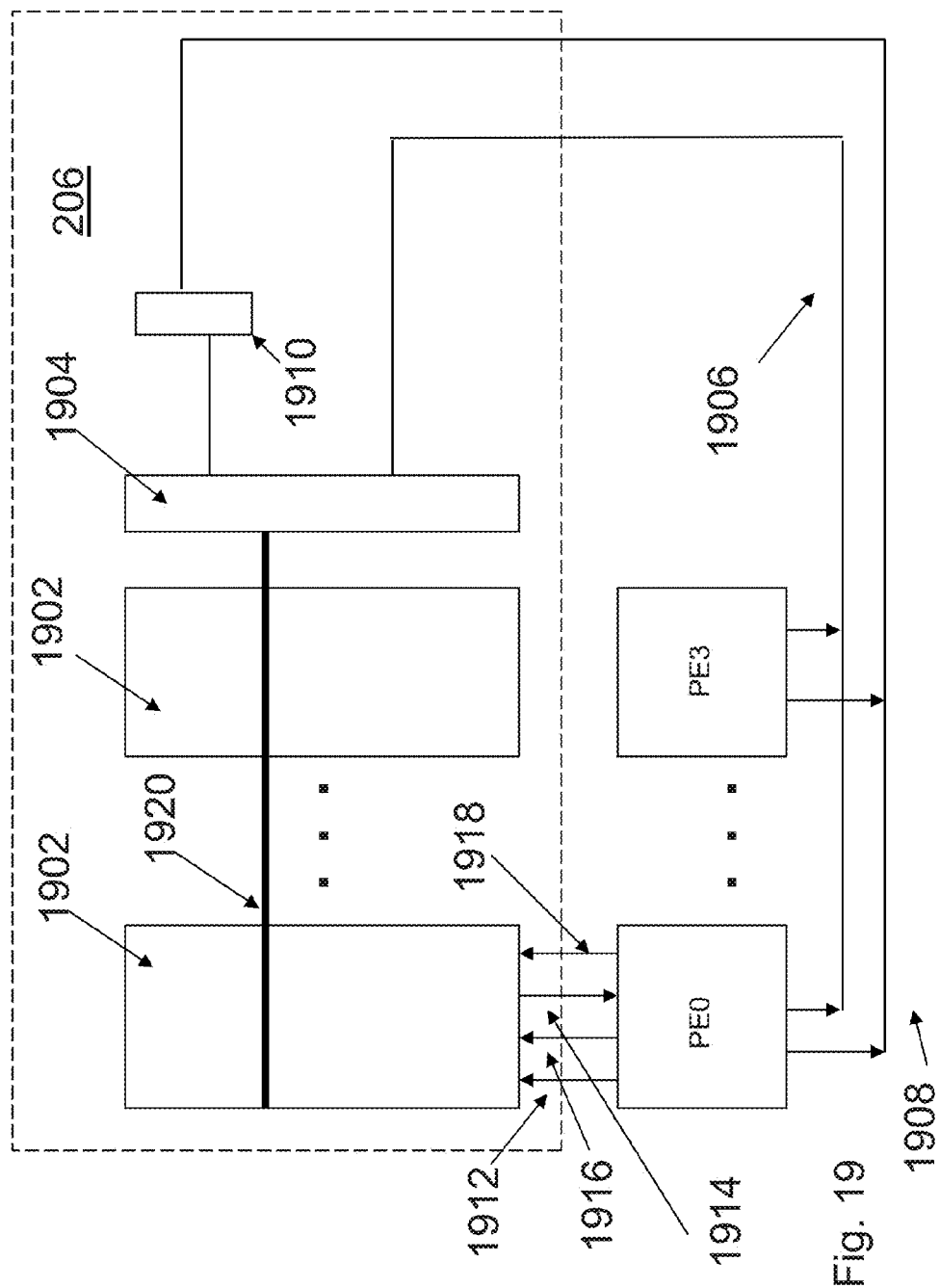
FIG. 19 shows a more detailed view of the data storage and its relationship with the processing elements according to an embodiment of the invention.

Referring now to FIG. 19, the relationship between aspects of the PEs 100 and the data RAM 206 are shown. Each data RAM 206 includes a column 1902 dedicated to a corresponding PE 100 in group 200, and an address decoder 1904. For ease of reference, only PE0 and PE3 are shown with their corresponding column 1902, although it is to be understood that PE1 and PE2 are present and similarly connected.

Each PE 100 has connections to its corresponding dedicated column 1902 of the data RAM 206 (shown for clarity in FIG. 19 only for PE0). Those connections may include write 1912, read 1914, column selector 1916, and read/write command 1918, although other connections could also be present.

Address decoder 1904 also receives two portions of an address. The first portion of the address is provided directly from one of the PEs 100 in the group 200 along a first address path 1906. A second portion of the address is also provided by PEs 100 in the group along a second address path 1908. Address paths 1906 and/or 1908 preferably pass through some type of intermediate element 1910, such as a register, which provides a hold and delay quality.

In the embodiment of FIG. 19, preferably only one of the PEs 100 at a time provides the least significant 8 bit portion of the address, and the register 1910 provides a second higher significant 8 bit portion of the address. In this manner, the address selected is based on a current and prior output of the PEs 100 within the group 200.

Address decoder 1904 utilizes the addresses provided by the first and second address paths 1906 and 1908, and converts them into a word line to select a row within data RAM 206, represented as 1920. Similarly, the column selector 1916 selects a column in data RAM 1902. In combination, the selection of row and column identifies a particular location in data RAM 206. Read 1914 and write 1912 will allow data to be read from or written to, respectively, data RAM 206 by the corresponding PE 100.

In this configuration, activation of a particular word line by address decoder 1904 allows multiple PEs 100 to independently read and write to corresponding locations within their dedicated portions of data RAM 206.

As discussed above, the various PEs 100 can combine to create larger machines. Their corresponding relationships with the data RAM 206 scale proportionally. Thus, by way of non-limiting example, two PEs can collectively form a 16-bit machine, made of two component halves that can either independently interact with data RAM 206 for 8-bit words, or collectively operate for 16-bit words.

As discussed above, data storage is preferably the combined size of the PEs 100 within its assigned group. Thus, by way of non-limiting example, four (4) 8-bit PEs 100 in group 200 would call for a 32-bit data RAM 206.

In an alternative embodiment, an extra bit could be provided in data RAM 206 for each column 1902 assigned to each PE 100 within the group 200. Thus, by way of non-limiting example, four (4) 8-bit PEs 100 in group 200 would call for a 36-bit data RAM 206. The additional bit provides for the optional generation of a parity bit that can be used to identify errors in the data stream.

In this alternative embodiment, when eight PEs 100 in two groups within the same cluster 400 form a 64-bit machine, then the total of eight (8) extra bits is sufficient to allow for generation of an error correction code (ECC) for the 64-bit words of the machine. The ability to generate such a code is preferably part of the data RAM 206, and not further discussed here.

Each group 200 has corresponding instruction storage 206, which may be an instruction RAM. For ease of discussion, reference is made to herein as instruction RAM 204 (which may be RAM, either alone or with supporting elements), although it is to be understood that other storage may be used.

Figure 20:
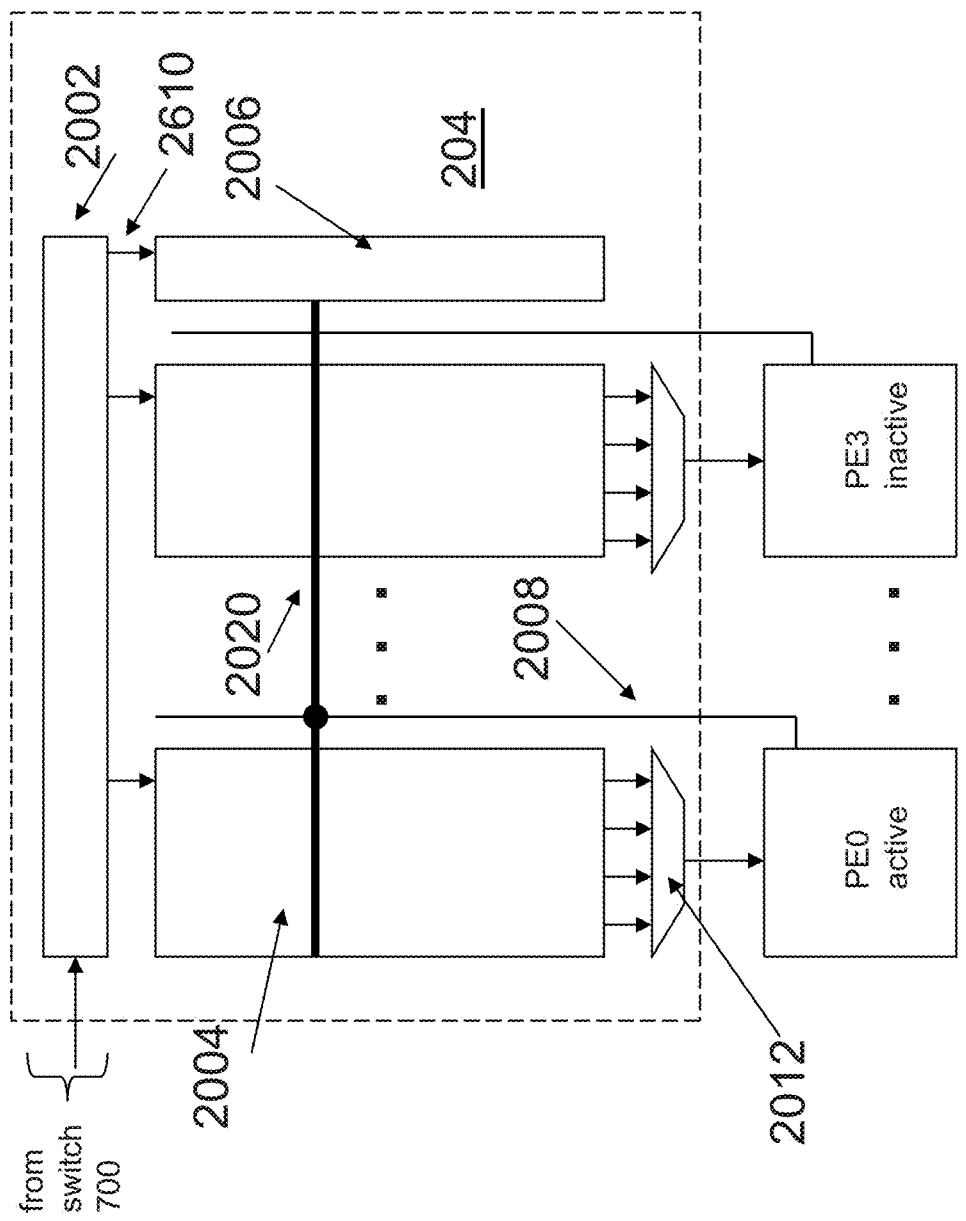
FIGS. 20-22 show a more detailed view of the instruction storage and its relationship with the processing elements according to various embodiments of the invention.

Referring now to FIG. 20, the relationship between aspects of the PEs 100 and the instruction RAM 204 within a group 200 are shown. Each instruction RAM 204 includes an instruction loader 2002 to load instructions into rows of individual storage 2004 reserved for each PE 100; for ease of reference, only PE0 and PE3 are shown, although it is to be understood that the remaining PEs 100 of the group 200 are similarly present. Preferably instructions are provided to loader 2002 via the switch fabric discussed above, but other methodologies may be used.

A program counter 2006 is repeatedly cycling through a count that sequentially activates each row (word line represented by 2020) of the individual storage 2004. Thus by way of non-limiting example the first count activates the first word line, and the second count activates the second word line, etc. In this manner, instruction RAM 204 does not need a specific address decoder, although such a configuration could nonetheless be used. Program counter preferably counts in response to an external signal, preferably a completion detection signal 2610 (discussed below) provided by switch 700 through instruction loader 2002.

As discussed below, each PE has the ability to indicate whether or not to receive an instruction. This indication is sent via the column select pathway 2008 and interacts with the word line from program counter 2006. If the PE 100 indicates that it will receive an instruction, then the instruction contained in that word line within instruction storage 2004 is sent to PE 100 via pathway 2008, which will then execute the instruction. If the PE indicates that it will not receive an instruction (which may be an affirmative signal to that effect or the absence of an enabling signal) then no instruction is sent to the PE 100, and that PE 100 is inactive. FIG. 20 shows PE0 as active, and PE3 as inactive (sometimes referred to as a sleep state).

Instruction memories tend to operate at slower speeds than the PEs 100. As such, a multiplexer 2012 is provided to select amongst portions of instruction lines. For example, each line of instruction in each instruction storage 2004 could be 44 bits, which requires a processing time of about 320 ps. A four way multiplexer selects from one of four sets of the instructions; this allows four different instructions of 11 bits to be read into each PE 100, These four sets of instructions can be read out sequentially at 80 ps, which is the preferred speed of the PE 100. The processing of the PE 100 will thus be consistent with the smaller sets of instructions as provided. To the extent that PEs 100 and/or individual storage 2004 are of different sizes, then preferably a distribution (such as multiplexer 2012) is provided to separate the instructions into smaller sizes consistent with the size of PE 100. The multiplexer 2012 (or whatever distribution structure is provided, can be controlled by a variety of sources, including data RAM 206, or previously loaded instructions from instruction RAM 204.

Figure 21:
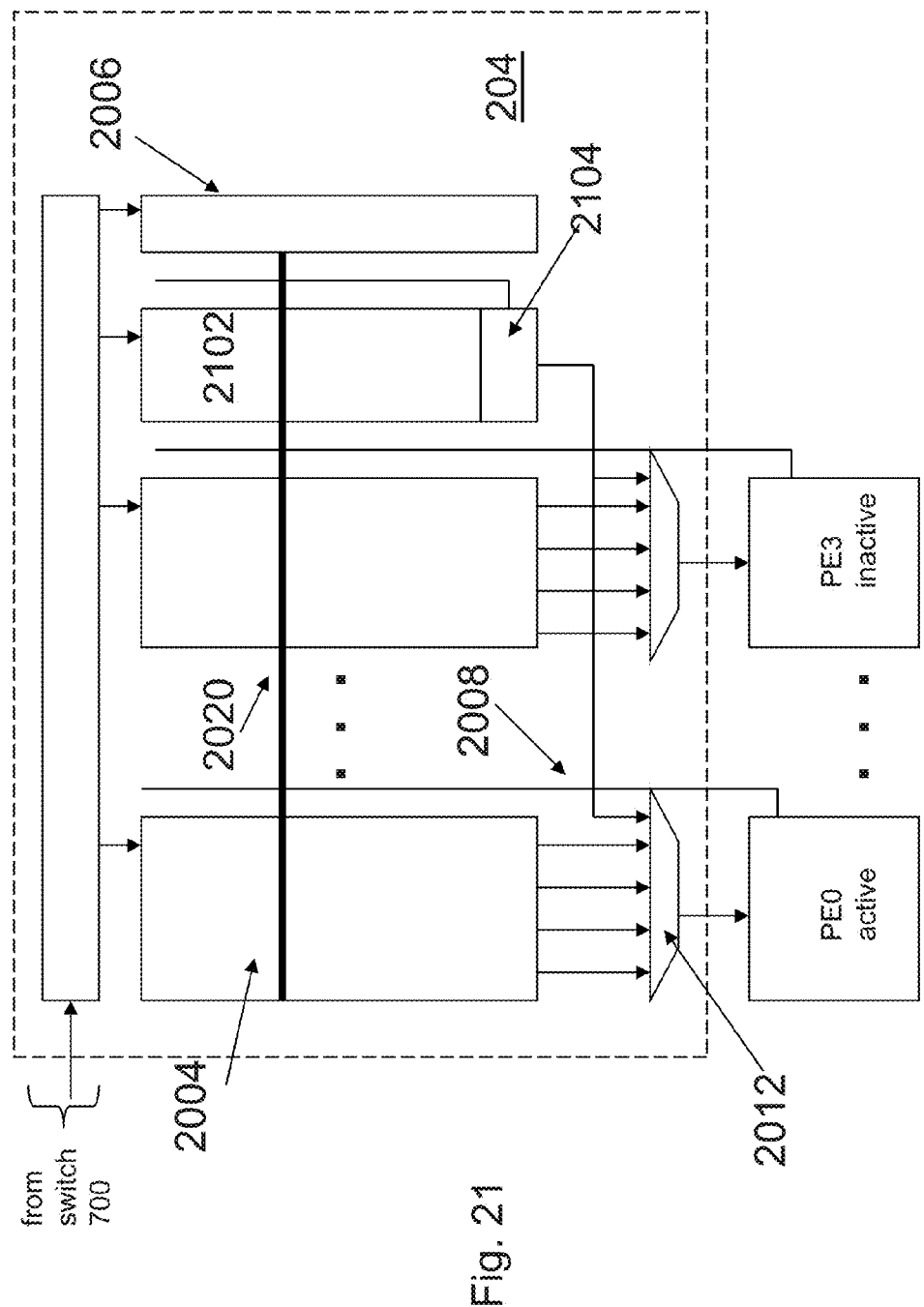

Referring now to FIG. 21, when an extra bit is provided for parity or ECC, a separate instruction storage 2102 is provided for the same. These bits may be fed into the multiplexers 2012, or an ECC generator 2104 that outputs to the multiplexer 2012 (the latter is shown in FIG. 21). The ECC generator can also provide an instruction on its own pathway 2006 to indicate whether to receive an instruction or not.

Figure 22:
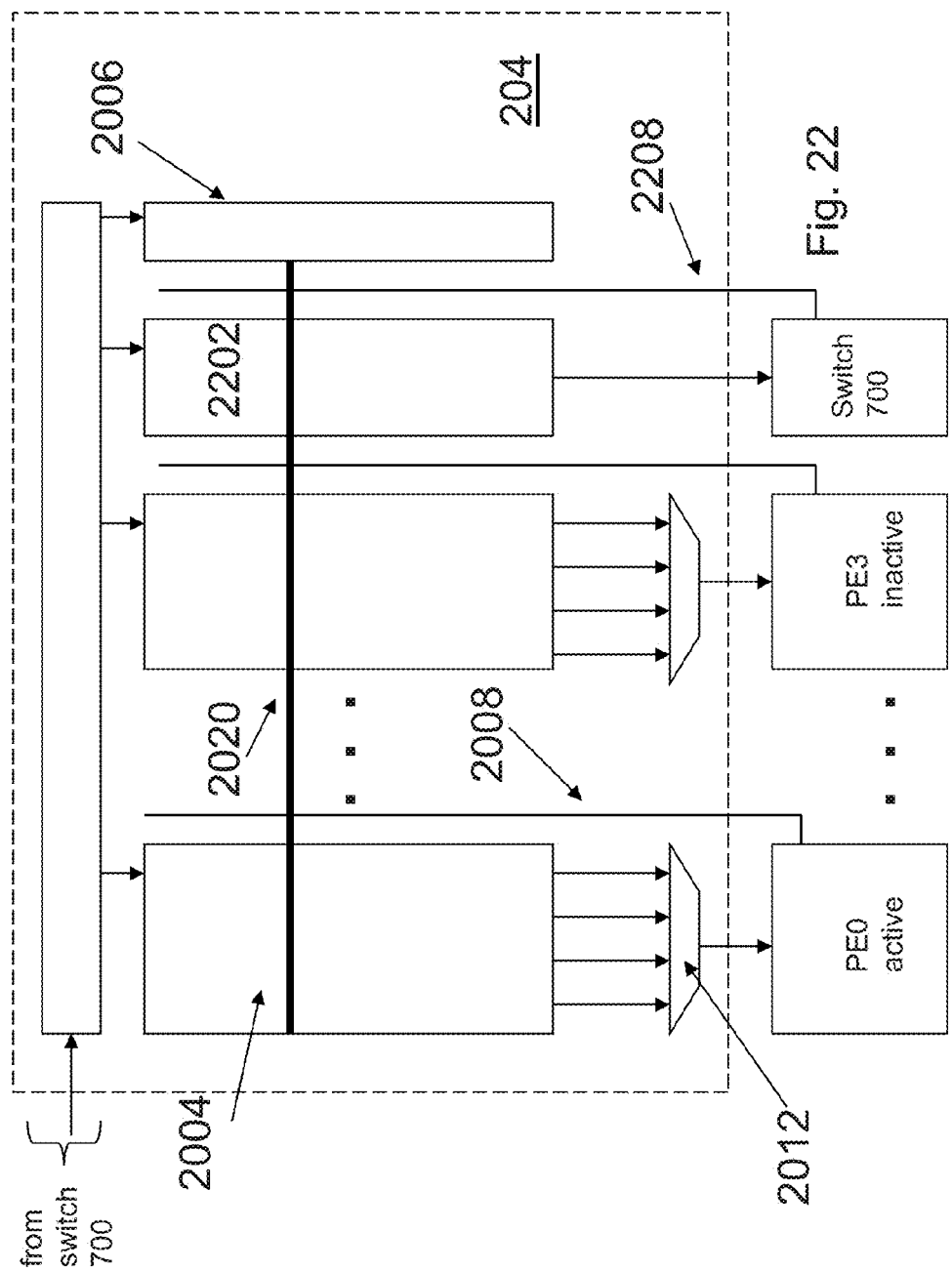

As discussed above, switch 700 may itself by its own processor, which may require instructions to process. Referring now to FIG. 22, a separate instruction storage 2202 is provided for switch 700 (or, as discussed below, at least the portion of the switch 700 under control for the group).

The same instruction storage 204 of FIG. 22 could be used for all groups 200. However, in certain embodiments, control over a switch 700, or sub switches 710, need only be effectuated by some of the groups 200. For example, consider the embodiment of FIG. 7A, in which switch 700 is provided as two sub-switches 710. Each sub-switch 700 is associated with two groups 200 of cluster 400. Of those groups 200, only one would have a data storage per FIG. 22 to provide instructions to the sub-switch 710. The instruction storage 204 of the groups that do not provide instructions for the switch 710 would be consistent with FIGS. 19 and 20.

A separate switch instruction storage 2202 is provided with instructions for the corresponding portion of switch 700. Like the PEs 100, switch 700 has the ability to indicate whether or not to receive an instruction. This indication is sent via the column select pathway 2208 and interacts with the word line from program counter 2006. If the switch indicates that it will receive an instruction, then the instruction contained in that word line in instruction storage 2004 is sent to switch 700, which will then execute the instruction. If switch 700 indicates that it will not receive an instruction (which may be an affirmative signal to that effect or the absence of a signal) then no instruction is sent to the switch 700, and that switch 700 is inactive.

Although no ECC components from FIG. 21 are shown in FIG. 22, it is to be understood that such ECC components could be present.

Figure 23:
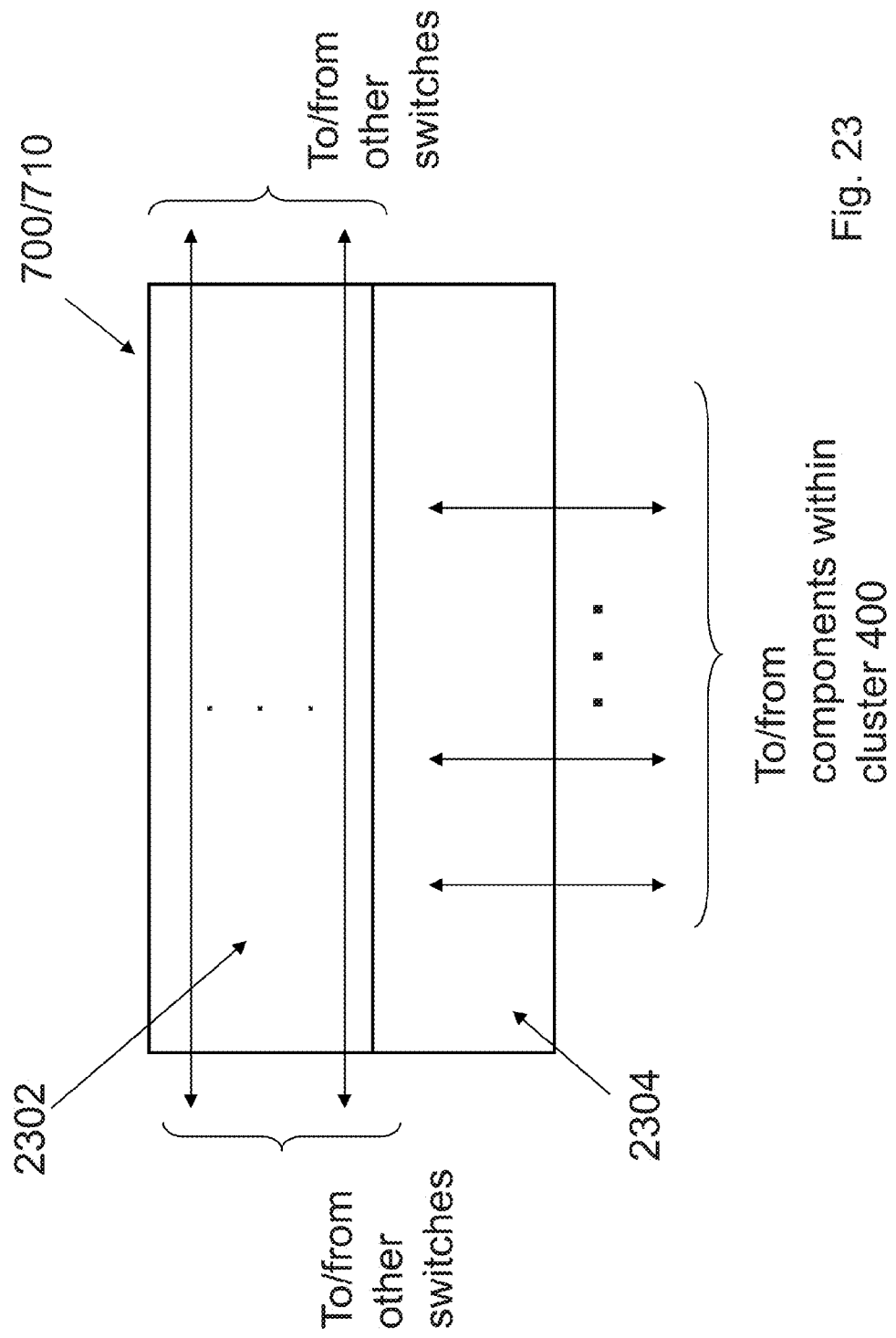
FIG. 23 shows different portions of a switch according to an embodiment of the invention.

Referring now to FIG. 23, each switch 700 (or subswitch) may include first and second portions 2302, 2304 (optionally referred to as upper and lower, respectively, although the invention is not limited thereto). The portions are shown in FIG. 23 as physical portions, but it is to be understood that the different portions could be physical and/or logical portions.

The first portion 2302 is responsible for routing within the switch fabric formed by the various switches 700. The second portion 2304 is responsible for the flow of data from the switch fabric into and out of its corresponding groups 200. If the groups 200 assigned to the switch 700 are inactive, then at least the second portion 2304 can be inactive (and thus issue the inactive command) to save power. The first portion 2302 of the switch 700 can remain active to facilitate higher level data routing. In the alternative, the first portion 2302 of the switch 2302 can also be inactive if the particular switch 700 is not needed for routing within the switch fabric.

As discussed above, each PE 100 can issue signals that indicate whether or not it will receive an instruction. The typical reason that the system would not want the PE 100 to receive an instruction is some condition or event that would cause instructions to be skipped. For example, suppose that a PE 100 is at the first word line in the instruction RAM 204. If a first condition is met, the program would want the PE 100 to execute the next (second) line of instructions. In this case, the PE 100 would indicate that it was ready to receive its next instruction.

However, if the first condition is not met, then the program would want PE 100 to "skip" to the fifth instruction line in the instruction RAM 204. Since instructions are read out in sequence via the program counter 2006, there is no option in instruction storage 204 or PE 100 to skip ahead to the fifth instruction. Instead, PE 100 goes inactive while the second, third and fourth lines of code are read out by the program counter. When the program counter reaches the fifth line of code, then the PE 100 reenters the active state so it can receive the fifth line of code. PE 100 thus effectively "skips" from the first to the fifth line by not receiving the intervening lines of code. This ability to "skip" is directed by a conditional command CC from multiplexer 1604 with PE 100, discussed above with respect to FIG. 16.

An alternative embodiment would have pipelining in the instruction decoding, and therefore the column select into the instruction RAM 204 would be adjusted accordingly. In this embodiment, the column select may only be disabled if the skip is above a certain number of instructions.

Embodiments of the operation and architecture of the ALU 102 within PE 100 is now addressed. As discussed above, the ALU 102 has one output 102c and two inputs 102a and 102b, for which the input 102b is the feedback of the output 102c. In this configuration, ALU 102 is acting as an accumulator circuit. ALU 102 is also receiving instructions on what logical operations to perform on the inputs 102*a* and 102*b* to generate the desired output 102*c*.

In the above configuration, ALU 102 thus needs three things to perform an Operation—the input 102*a*, the input 102*b* as feedback from 102*c*, and the instructions as to what logical operation to perform. Of these three needs, two are met in advance—the ALU 102 will already have instructions and the input 102*b*; it is simply waiting for the input 102*a* to fill the set before it can act. Under these conditions, because ALU 102 is limited to logical operations, ALU 102 can pre-process the output 102*c* based on the two possible values (0 or 1) and have the potential resultant values ready to output based on the nature of the input 102*a* when it arrives.

Figure 24:
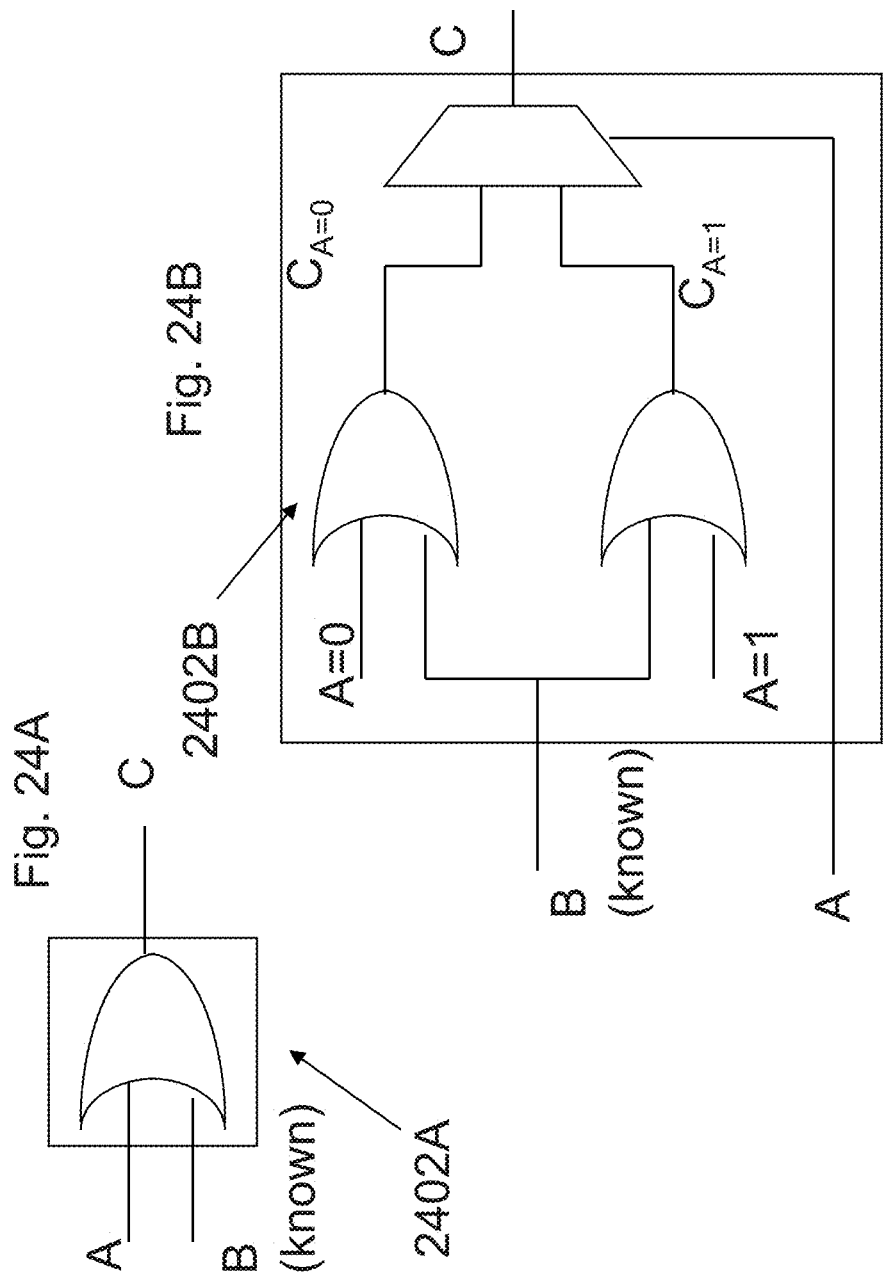
FIGS. 24A and 24B show examples of how to output the result of an OR function according to an embodiment of the invention.

A conceptual example of this for a one-bit machine is shown in FIGS. 24A and 24B. By way of example, suppose the instruction is for an OR of single bits A and B to produce result C, where B is known in advance (as is the case with input 102*b* for ALU 102). In FIGS. 24A and 24B, a processing element 2402A is configured to operate as an OR gate. In the embodiment of FIG. 24A, the OR gate functionality will calculate C when A becomes available. The speed to generate the output C is dependent upon the speed at which it takes processing element 2402 to perform the logical OR operation. Thus, if B=0, the speed of processing element 2042 in FIG. 24A would be the time it takes for the OR gate to determine C based on the value of A.

However, since (1) B is known in advance, and (2) A can only assume two values, 0 or 1, then in an embodiment of the invention, ALU 102 can process in advance what the result would be based on A=0 and A=1. Those two outputs—$C_{A=0}$ and $C_{A=1}$, respectively—are then fed to a multiplexer 2404. When the input A arrives, rather than being an input that is processed to define the output, it becomes a control signal to the multiplexer 2404 that simply selects the appropriate preprocessed value. If A=1, the $C_{A=1}$ value is passed to the output C. If A=0, then the $C_{A=0}$ value is passed to the output C. Since the speed of a multiplexer responding to a control signal is typically faster than the time it takes to process an input to generate an output, the processing element 2402B is faster than processing element 2402A. Preferably, the ALU 102 of PE 100 is designed according to the example shown in FIG. 24B.

The above example scales up the bit size of the ALU 102. Thus, if the ALU 102 is an 8-bit machine, then ALU 102 preprocesses the output 102*c* individually for each of the 8 bits. Again, the speed of the ALU is set by the multiplexer selection speed rather than the speed to perform the logical operation.

It should be noted that even the above processing for FIG. 24B may not be necessary. For example, if value B had been B=1, then for A OR B, the result is C=1 regardless of the value of A. Thus, separate processing for A=0 and A=1 was not necessary.

This can be addressed by defining the environment for the ALU 102 and optimizing the processing elements. By way of non-limiting example, suppose that the logical operations to be performed by ALU 102 were AND, OR, and XOR. Those possible logical operations, in combination with the possible values, generate the following truth table:

| Input 102b = | Operations | For Input 102a = 0 Output 102c = | For Input 102a = 1 Output 102c = |
|---|---|---|---|
| 0 | OR | 0 | 1 |
| 1 | OR | 1 | 1 |

-continued

| Input 102b = | Operations | For Input 102a = 0 Output 102c = | For Input 102a = 1 Output 102c = |
|---|---|---|---|
| 0 | AND | 0 | 0 |
| 1 | AND | 0 | 1 |
| 0 | XOR | 0 | 1 |
| 1 | XOR | 1 | 0 |

Combining the needs for a processing element 2402 to process consistent with this table and multiplexer 2404, then all or part of 2402 and 2404 can be optimized into a single circuit that is much faster than three different logic gates for AND, OR, and XOR.

Exemplary architecture and methodology for ALU 102 per the above is shown in U.S. Ser. No. 61/646,653 entitled Implementation Method for Fast NCL Data path, filed May 14, 2012, the subject matter of which is expressly incorporated herein by reference in its entirety.

To operate effectively, the overall circuitry needs to maintain some level of synchronization so that the PEs in one group 200 or cluster 400 do not get ahead of a different group or cluster. Since timing of activity within each group 200 is dictated by program counter 2006, some mechanism is preferred to ensure that one program counter 2006 is not advancing operations of its group 200 before the circuit is ready.

One way to accomplish this is to have a global clock connect to each program counter 2006, such that counter 2006 moves in synchronization with the clock signal.

However, a design that occupies less area and requires less power omits a global clock in favor of local feedback and complete detection. Specifically, within a cluster each PE 100 may have a complete detection feature that generates a complete detection signal when the active PE has finished the processing of the logic to which it was instructed to perform. Switch 700 similarly may have a complete detection feature that generates a complete detection signal when it has completed its assigned operation. To the extent that there are inactive PEs 100 or switches 700, the circuit is not waiting on this inactive element to complete processing, and thus their individual completion detection signals would generally default to output such a complete detection signal.

All of these completion signals are being generated within the various clusters 400 through the circuit 1000. To create synchronization, various completion detection signals are collected locally at the cluster 400 level and from neighboring clusters. This will cascade throughout the circuit 1000 to synchronize the entire circuit.

Figure 26:
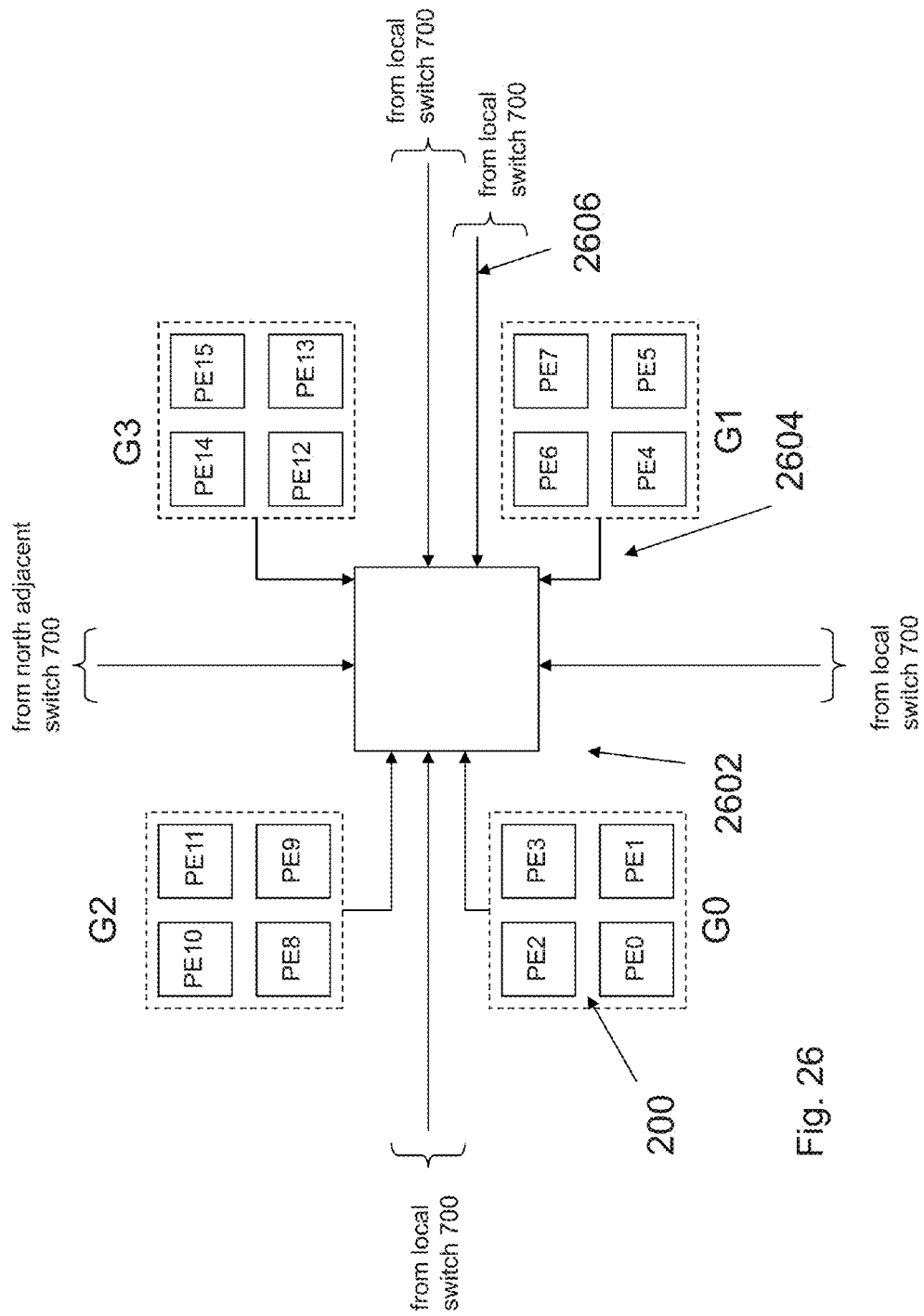
FIG. 26 shows completion detection functionality according to an embodiment of the invention.

Specifically, referring now to FIG. 26, within each cluster 400, the completion detection signals are received locally by cluster complete detection circuitry 2602 cluster completion detection circuit 2602 may be part of switch 700/710, but may be located elsewhere.

Cluster completion detection circuit 2602 receives the complete detection signals of the PEs 100 within each group 200 within the cluster 400. These could be distinct signals sent from each of the PEs 100, or on a group 200 basis (in which the individual groups 200 may have their own completion detection circuits, such as AND gates, for generating a group 200 completion circuit that resolves completion of the PEs 100 within the group 200). FIG. 26 shows such completion signals at 2604. Although only one signal is shown from each group 200, this signal represents either a single group signal and/or signals from the individual PEs 100.

Cluster completion detection circuit 2602 also receives the completion detection signals of switch 700, shown at 2606. To the extent that cluster completion detection circuit 2602 is part of switch 700, then 2606 may be an internal signal of switch 700.

As discussed with respect to FIG. 8, each cluster 400 has adjacent clusters 400. With the exception of cluster 400 along the edges, each non-edge cluster will have eight (8) surrounding clusters 400. Of these, four (4) are adjacent in the switch fabric to the left, right, top and bottom, each of which contains its own switch 700. Cluster completion detection circuit 2602 also receives the completion detection signals of these four (4) horizontal and vertically adjacent switches 700 from adjacent switches 700.

In response to these various completion signals, the completion detection circuit 2602, which may be part of switch 700, generates a cluster completion detection signal 2610. This completion detection signal 2610 is sent to the program counters 2006 within the individual groups 200, which respond by moving to the next count to implement the next instruction. This completion detection signal 2610 is also sent to the top, bottom, left, and right groups 200 so that their completion detection circuits 2602 can themselves process their own completion detection processing.

Figure 27:
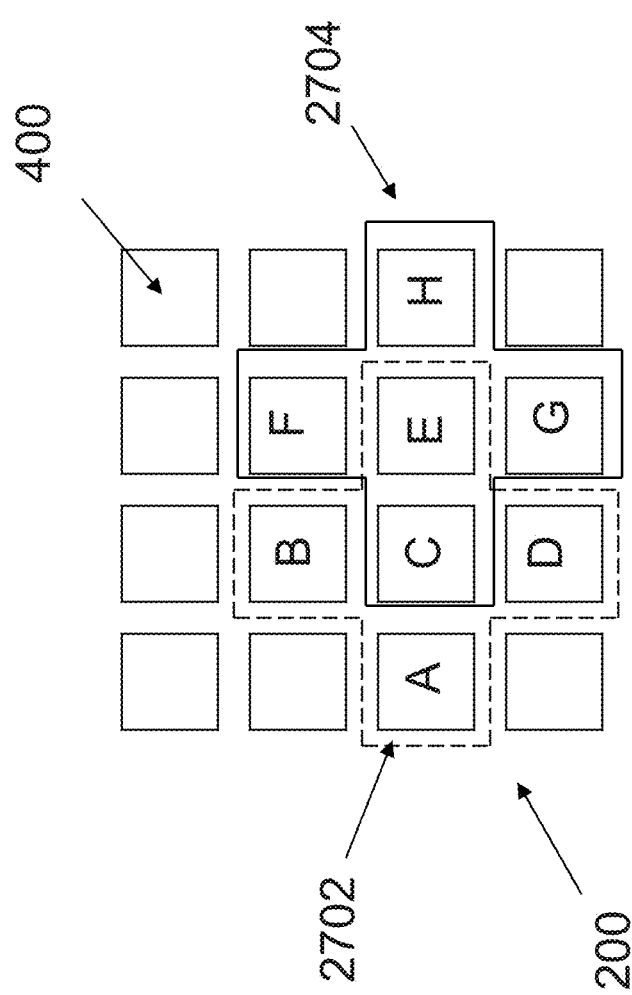
FIG. 27 shows the overlap in synchronization groups according to an embodiment of the invention.

The above design triggers a cascade effect of self-synchronization. Specifically, as discussed above, each cluster 400 synchronizes based on its own state and the states of the neighboring clusters. Thus, for example in FIG. 27, five clusters 400 make up a synchronization group 2702 (shown in dashed lines) that includes clusters A-E. However, there is an adjacent synchronization group 2704 (shown in solid line) that includes clusters C-H. Synchronization groups 2702 and 2704 overlap in clusters C, D, and E. Thus, the efforts of the individual synchronization groups 2702 and 2704 to synchronize amongst themselves cause the groups 2702 and 2704 to effectively synchronize collectively.

As noted above, this effect cascades throughout the circuit 1000. For any synchronization group, there is some degree of overlap in shared clusters 400 with up to eighteen (18) surrounding synchronization groups (clusters 400 along the edge will have less). Each of those eighteen (18) surrounding synchronization groups have upwards of there own eighteen (18) surrounding synchronization groups, and so on, all working together to synchronize. Effectively, every synchronization group in the entire circuit 1000 works toward a common goal of reaching a global state of completion.

When that global state of completion is reached, all of the PEs 100 can receive there next set of instructions. Each cluster completion detection circuit 2602 within each cluster 400 (to the extent the cluster has active elements) sends a command to the program counter 2006 in the instruction storage 204 to advance the count to the next instruction word line.

In the above completion detection discussion, Applicants note that the MWU 1200 is not monitored for completion detection. As discussed above, logic functions take less time to compute than mathematical functions. The above methodology, by driving completion detection and subsequent instructions based on the speed of the logic processing of the PEs 100, operates based on the speed of logic operations without being restricted by the slower speed of the mathematics. Mathematics thus can still be ongoing while the circuit 1000 is otherwise synchronizing for the next instruction.

In some cases the mathematics may not be complete by the time the circuit reaches a state by which the next instruction is generated by the program counters 2006.

However, as the time for the mathematics is known, the delay is simply accounted for in the programming. For example, if the mathematics would not be complete for three (3) logic instructions, then the code that controls the PEs 100 would be designed to put those PEs 100 to sleep for two instruction cycles, and then wake the PEs 100 to process the mathematics on that third instruction cycle.

Further, as discussed above, the logic processing of the PEs 100 are preferably not operating at the speed of logic operations per FIG. 24A, but rather the speed that it takes to switch to the proper output based on pre-calculation of the logic operations per FIGS. 24B and 25. This is a the factor that controls the overall speed of circuit 1000, independent of the restrictions of mathematical operations.

Figure 9:
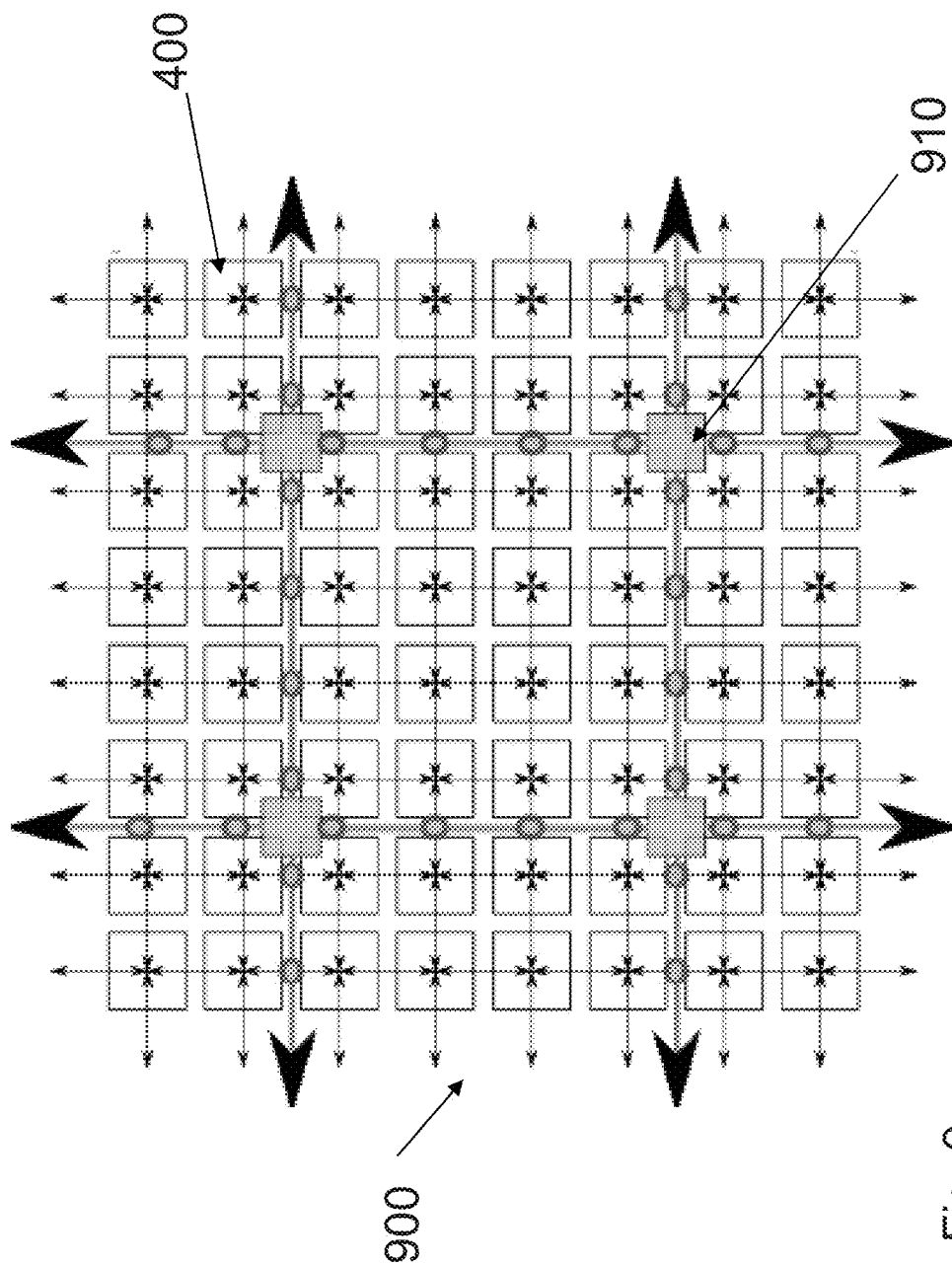
FIG. 9 shows a super cluster according to an embodiment of the invention.

As discussed above, clusters 400 may be placed into groups. A non-limiting theoretical example is shown in FIG. 9, in which clusters 400 may be organized into super clusters 900. In the embodiment of FIG. 9, sixty four (64) clusters 400 are provided in an 8×8 matrix to provide 1024 PEs 100, although any number may be included in a super cluster 900. A higher layer switch fabric 910 connects the clusters 400 to each other within super clusters 900, preferably using the same methodology as the switch fabric defined by switching elements 700 in FIG. 8. However, other switch fabrics may be used.

Figure 11:
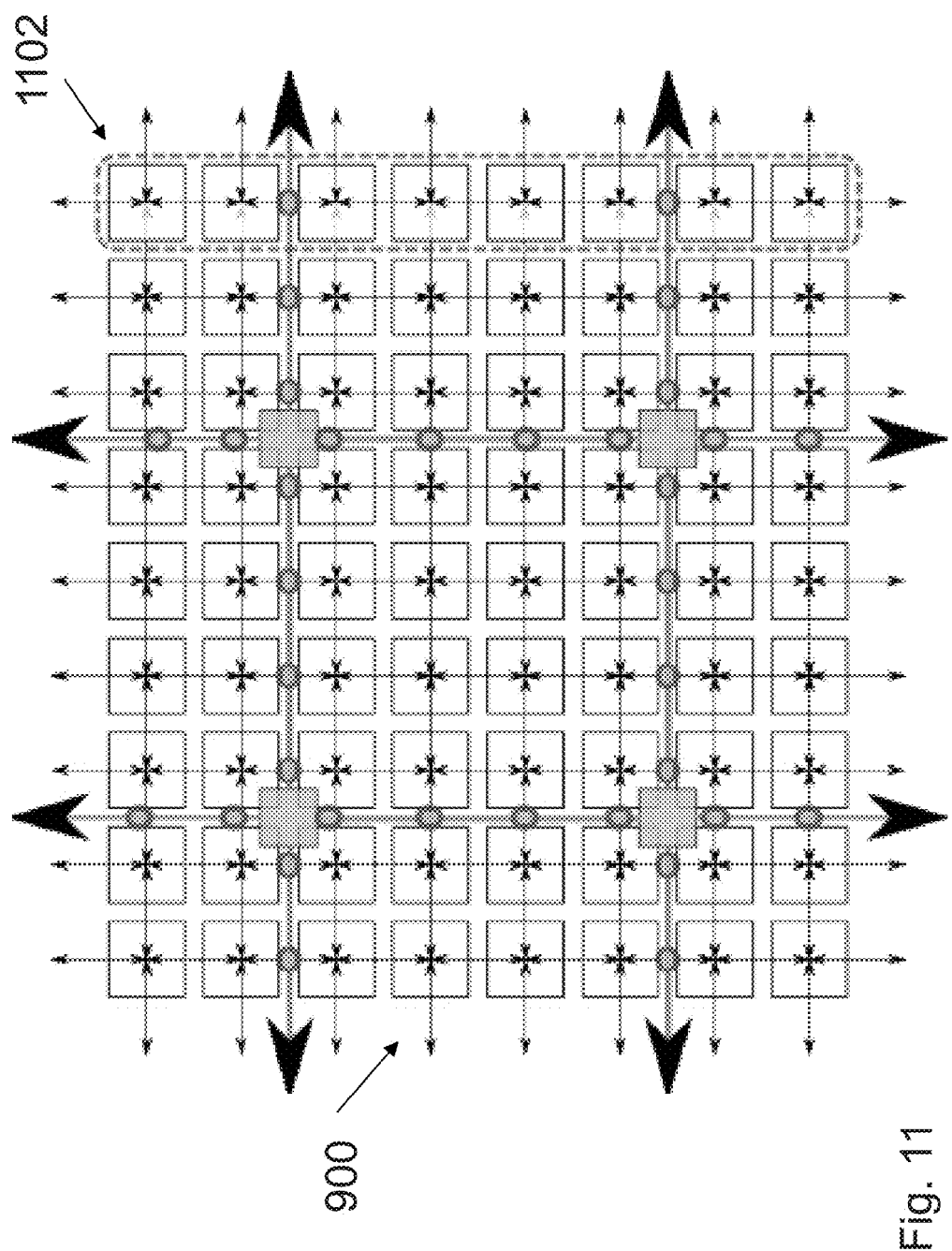
FIG. 11 shows a super cluster according to an embodiment of the invention.

FIG. 11 shows an optional feature of an embodiment, in which at least one super cluster 900 is provided with an optional column 1102 of clusters 400. This optional column 1102 provides fault tolerance without changing routing or scheduling. Some or all of the super clusters 900 in SD-ASIC 1000 may have such an optional column. By way of non-limiting example, one out of every four super clusters 900 could include an optional column 1102. These spare clusters 400 could be in other configurations, such as rows or randomly distributed.

Circuit 1010 according to the methodologies discussed herein leverage many of the advantages of FPGAs and ASICs without corresponding disadvantages:

|  | FPGA | ASIC | Circuit 1010 |
| --- | --- | --- | --- |
| Speed | Slow | Fast | Fast |
| Non-recurring engineering costs | Low | High | Low |
| Reconfigurable | Yes | No | Yes |
| Power Consumption | High | Low | Low |
| Per Unit Cost | High | Low | Low |

It will be apparent to those skilled in the art that modifications and variations may be made in the systems and methods of the present invention without departing from the spirit or scope of the invention. It is intended that the present invention cover the modifications and variations of this invention provided they come within the scope of the appended claims and their equivalents.

What is claimed is:
1. A processing device, comprising:
   a cluster including a plurality of groups of processing elements along with an instruction RAM coupled to the processing elements within the groups along with a program counter that repeatedly cycles through a count that sequentially activates each row of the instruction RAM wherein the instruction RAM provides instructions to the processing elements within the groups;
   a multi-word device connected to the processing elements within the groups;

each processing element in a particular group being in communication with:
  all other processing elements within the particular group; and
  only one of the processing elements within other groups in the cluster;
wherein each processing element is limited to operations in which input bits can be processed and an output obtained without reference to other bits; and
wherein the multi-word device is configured to cooperate with at least two other processing elements to perform processing that requires reference to other bits to obtain a result.

2. The processing device of claim 1, wherein the multi-word device provides its output to at least one of the at least two processing elements.

3. The processing device of claim 1, wherein the processing elements can be configured to provide processing selected from the group including AND and OR.

4. The processing device of claim 1, wherein the multi-word device is separated into portions for providing addition, multiplication, and shifting.

5. The processing device of claim 1, wherein the multi-word device can be configured to provide processing selected from the group including addition, subtraction, multiplication, signed multiplication, compare less than, signed compare less than, left shift, right shift, and arithmetic right shift.

* * * * *